(12) United States Patent
Shirai et al.

(10) Patent No.: US 6,657,762 B2
(45) Date of Patent: Dec. 2, 2003

(54) OPTICAL BARRIER DEVICE

(75) Inventors: Toshihito Shirai, Kuki (JP); Koichi Futsuhara, Kuki (JP)

(73) Assignee: The Nippon Signal Co., Ltd., Tokyo (JP)

( * ) Notice: Subject to any disclaimer, the term of this patent is extended or adjusted under 35 U.S.C. 154(b) by 0 days.

(21) Appl. No.: 09/914,443

(22) PCT Filed: Dec. 28, 2000

(86) PCT No.: PCT/JP00/09439

§ 371 (c)(1),
(2), (4) Date: Aug. 28, 2001

(87) PCT Pub. No.: WO01/50157

PCT Pub. Date: Jul. 12, 2001

(65) Prior Publication Data

US 2002/0135849 A1 Sep. 26, 2002

(30) Foreign Application Priority Data

Jan. 6, 2000 (JP) ........................ 2000-001135

(51) Int. Cl.[7] ............................................. G02B 26/08
(52) U.S. Cl. ..................... 359/212; 359/223; 250/234
(58) Field of Search ................. 359/212, 223, 359/224, 196, 197, 204, 226; 250/234, 235, 221

(56) References Cited

U.S. PATENT DOCUMENTS

| | | | |
|---|---|---|---|
| 4,661,880 A | 4/1987 | Futsuhara ............... | 361/93 |
| 4,855,608 A | * 8/1989 | Peterson, II ............ | 250/221 |
| 5,027,114 A | 6/1991 | Kawashima et al. ..... | 340/941 |
| 5,345,138 A | 9/1994 | Mukaidono et al. ..... | 307/326 |
| 5,493,112 A | * 2/1996 | Welch .................... | 250/221 |
| 6,046,834 A | * 4/2000 | Asada et al. ............ | 250/236 |

FOREIGN PATENT DOCUMENTS

| | | |
|---|---|---|
| JP | 57-157623 | 9/1982 |
| JP | 05-060993 | 3/1993 |
| JP | IIC-94-23 | 7/1994 |
| JP | 08-220453 | 8/1996 |
| JP | 09-162714 | 6/1997 |
| JP | 09-185778 | 7/1997 |
| JP | 10-227856 | 8/1998 |
| WO | WO94/23303 | 10/1994 |
| WO | WO94/23496 | 10/1994 |
| WO | WO97/33186 | 9/1997 |

OTHER PUBLICATIONS

C. Roychoudhuri, et al., "Miniature and Micro–Optics: Fabrication and System Applications", SPIE—The International Society for Optical Engineering, pp. 272–281, (Jul. 1991).
K. Futsuhara, et al., "Application of Window Comparator to Majority Operation", IEEE, pp. 114–121, (1989).
K. Futsuhara et al., "A Construction Method for an Interlock System Using a Fail–Safe Logic Element Having Window Characteristics", T. IEE Japan, vol. 109 C No. 9, (1989).

* cited by examiner

Primary Examiner—Euncha Cherry
(74) Attorney, Agent, or Firm—Finnegan, Henderson, Farabow, Garrett & Dunner, L.L.P.

(57) ABSTRACT

The present invention relates to an optical barrier apparatus which scans a detection area with an optical beam, and when the scanning beam is blocked by an object so that a reflection beam is not received, notifies of object presence. An optical beam from an optical beam generating circuit (11) is reflected by a scan mirror (12) and a detection area (1) is scanned by a scanning beam (BM1). The scanning beam (BM1) is reflected by a reflector array (23) of another unit and received by a light receiving element (14), and the presence/absence of a pulse deficiency of light reception output is detected by a signal deficiency detection circuit (15). When the scanning beam (BM1) is blocked by an object (30) so that a part of the reflection beam from the reflector array (23) cannot be received and a pulse deficiency occurs in the light reception output, an output (Z1) from the signal deficiency detection circuit (15) becomes a logic value zero to thus notify of object presence.

18 Claims, 20 Drawing Sheets

OPTICAL BARRIER DEVICE

TECHNICAL FIELD

The present invention relates to an optical barrier apparatus used in safety equipment and the like for industrial machinery. In particular the invention relates to an optical barrier apparatus (also referred to as an optical barrier sensor) for scanning a detection area with an optical beam, and judging the absence of object when a reflection beam of the optical beam is received, and judging the presence of object when not received.

BACKGROUND ART

As such an optical beam scanning type optical barrier apparatus, there is the apparatus disclosed for example in PCT International Publication No. WO97/33186, and this will be briefly described.

In FIG. 2 of PCT International Publication No. WO97/33186, a laser beam generating means and a laser scanning means are arranged on one side of a detection area, and an array light receiving elements is arranged on the other side. In this apparatus, a laser beam generated by the laser beam generating device is projected onto the laser scanning device, and the laser scanning device reflects the laser beam so as to scan an area including the detection area. If an object is not present inside the detection area, the laser beam is received by the light receiving element array. If an object is present inside the detection area, the laser beam is blocked by the object so that the light receiving element positioned in the shadow of the object within the light receiving element array does not receive the laser beam. The deficiency of light reception output signal from the light receiving element array, which occurs at this time, is detected by a signal deficiency detecting means, thus notifying of the presence of object.

Furthermore, in FIG. 3 and FIG. 6 of PCT International Publication No. WO97/33186, there is disclosed a construction which uses a reflecting mirror.

In FIG. 3, the construction is such that a laser beam generating device, a laser scanning device and a light receiving element array are arranged on the same side, and a concave reflecting mirror is arranged on the other side. A laser beam generated by the laser beam generating device is scanned at a predetermined spread angle by the laser scanning device, and projected onto the concave reflecting mirror arranged on the other side. The laser beams reflected by the concave reflecting mirror are passed through a detection area as mutually parallel beams to be directed towards the light receiving element array. Furthermore, in FIG. 6, the construction is such that the light receiving element array of FIG. 3 is replaced with a single light receiving element, and the position of the laser scanning device and the shape and position of the concave reflecting mirror are adjusted so that the reflected light of the concave reflecting mirror is focused onto the single light receiving element.

However, with the abovementioned optical beam scanning type optical barrier apparatus, in the constructions of FIG. 2 and FIG. 3, since a light receiving element array is used, it is necessary to adjust light reception directional characteristics of the light receiving element array with respect to each of the elements. Furthermore, a light receiving circuit is needed for each of the respective light receiving elements, and hence there is a problem in that cost reduction is difficult.

Furthermore, with the construction of FIG. 6, the light receiving element is only one, and hence the cost can be reduced compared to FIG. 2 and FIG. 3. However there is a problem in that there exists an area where the object detection is not possible, and the detection area thus becomes narrow.

The present invention addresses the abovementioned problems with the object of providing an optical barrier apparatus enabling of cost reduction without narrowing the detection area.

DISCLOSURE OF THE INVENTION

In order to achieve the aforementioned object, an optical barrier apparatus according to the present invention comprises a first and second units facing each other with a detection area therebetween, each of the first and second units comprising: optical beam generating means, optical beam scanning means for reflecting an optical beam generated by the optical beam generating means so as to scan an area containing the detection area, optical beam reflecting means for reflecting a scanning beam incident from the optical beam scanning means via the detection area by turning back at approximately 180 degrees, light receiving means arranged in the vicinity of the optical beam scanning means for receiving a reflection beam from the optical beam reflecting means, and signal deficiency detecting means for detecting the presence/absence of a deficiency of output signal of the light receiving means and generating a notification output for object absence at the time of no deficiency, wherein the optical beam scanning means and the light receiving means of the first unit and the optical beam scanning means and the light receiving means of the second unit are arranged on either side of the detection area at approximately diagonal positions.

With such a construction, the optical beam generated from the optical beam generating means is reflected and scanned by the optical beam scanning means. If an object is present in the detection area, the scanning beam does not reach the optical beam reflecting means so that an optical beam at a predetermined level or above is not received by the light receiving means. If an object is not present in the detection area, the scanning beam is reflected by the optical beam reflecting means and the light receiving means receives a reflection beam at a predetermined level or above. The signal deficiency detecting means, if an output level of the light receiving means is at the predetermined level or above, generates a notification output for object absence. This type of object detection is respectively performed in the first unit and second unit. Moreover, since the optical beam scanning means and light receiving means of the first unit, and the optical beam scanning means and light receiving means of the second unit are arranged at diagonal positions on either side of the detection area, the area where object detection is possible becomes a rectangular shape. As a result, the number of light receiving means can be reduced, costs can be reduced, and the detection area becomes rectangular so that the detection area can be widened.

The construction may be such that there is provided synchronous drive means for synchronizing the two optical beam scanning means of the first and second units with respect to each other so that when a scanning beam direction on the first unit side is a diagonal direction, a scanning beam direction on the second unit side is also a diagonal direction. Then, when a scanning beam direction of one unit is a diagonal direction where it is easy for an optical beam from the other unit to be erroneously received, if an object is present on an optical axis of an optical beam from the one unit, the scanning beam is blocked by the object so that erroneous notification attributable to reception of the scanning beam of the other unit can be prevented.

Moreover, the construction may be such that there is provided selection drive means for selectively driving the first and second units so that object detection operations of the first unit and second unit are not performed at the same time. Since when one unit is being driven the other unit is stopped, erroneous notification attributable to reception of the scanning beam of the other unit can be prevented.

Furthermore, the construction may be such the emission wavelengths of optical beams respectively generated from the respective optical beam generating means of the first unit and second unit are made different from each other. Moreover, the construction may be such that blinking frequencies of reflection beams respectively reflected from each optical beam reflecting means of the first unit and second unit are made different from each other. In this case also, since the optical beam of the own unit and the optical beam of the other unit can be distinguished, erroneous notification attributable to reception of the scanning beam of the other unit can be prevented.

Moreover, the construction may be such that each signal deficiency detecting means verifies that a light reception output from the light receiving means is one based on a reflection beam from the optical beam reflecting means, to generate a notification output for object absence.

With such a construction, since it becomes possible to distinguish between the reflection light from the optical beam reflecting means and the light reflected by the object, then even in the case where the reflectance of the object is high so that the light reception level of reflection light from the object is equal to or above a predetermined level, or the case where the object is near the light receiving means so that the light reception level of irregularly reflected light from the object is equal to or above a predetermined level, erroneous notification can be prevented.

Furthermore, the construction may be such that scanning verification means for verifying that the scanning beam is scanned within a range of the area including the detection area is provided in each unit.

With such a construction, it becomes possible to verify with the scanning verification means, that the scanning beam is normally scanning the detection area. Therefore, in the case where this construction is used as a safety ensuring facility for a machine, reliability for the optical barrier apparatus can be improved.

BEST MODE FOR CARRYING OUT THE INVENTION

Hereunder is a description of embodiments of an optical barrier apparatus according to the present invention based on the appended drawings.

Figure 1:
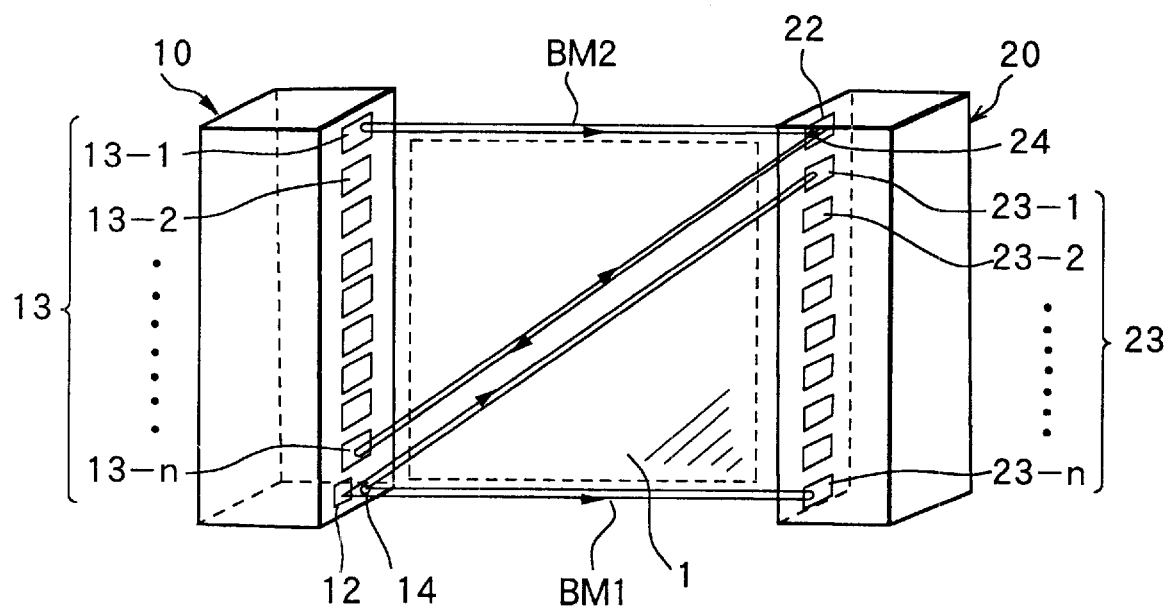
FIG. 1 is a schematic configuration diagram of a first embodiment of an optical barrier apparatus according to the present invention.

FIG. 1 shows a schematic configuration of a first embodiment of the optical barrier apparatus according to the present invention.

In FIG. 1, the optical barrier apparatus according to this embodiment comprises first and second units 10 and 20 facing each other on either side of a detection area 1.

Each unit 10 and 20 comprises; an optical beam generating circuit 11, 21 (shown in FIG. 2) serving as optical beam generating means, a scan mirror 12, 22 for reflecting an optical beam generated from the optical beam generating circuit 11, 21 so as to scan the detection area 1 at a predetermined spread angle and generate scanning beams BM1, BM2, a reflector array 13, 23 serving as optical beam reflecting means, having multiple reflectors 13-1 to 13-n, 23-1 to 23-n arranged in the vertical direction of the detecting area 1, for reflecting the scanning beams BM1, BM2 incident via the detection area 1 by turning back at approximately 180 degrees, a light receiving element 14, 24 serving as light receiving means arranged in the vicinity of the scan mirror 12, 22 for receiving reflection beams reflected by the reflector array 13, 23 and incident via the detection area 1, and a signal deficiency detection circuit 15, 25 (shown in FIG. 2) serving as signal deficiency detecting means for detecting the presence/absence of a deficiency of an output signal of the light receiving element 14, 24 to generate a notification output for object absence when there is no deficiency.

A detection area by one unit of the optical barrier apparatus of this embodiment is of approximate triangular shape with the scan mirror 12 (scan mirror 22) on the first unit 10 (second unit 20) side and opposite end reflectors 23-1 and 23-n (reflectors 13-1 and 13-n) on the second unit 20 (first unit 10) as apexes. Furthermore, with the optical barrier apparatus of this embodiment, the scan mirror 12 and the light receiving element 14 of the first unit 10, and the scan mirror 22 and the light receiving element 24 of the second unit 20 are arranged diagonally as shown in FIG. 1 on either side of the detection area 1. Therefore with the optical barrier apparatus of this embodiment, an approximate rectangular shape detection area 1 can be obtained as in FIG. 1.

Here, the optical beam to be used may be of narrow directionality, for example, a laser beam is desirable. However, an optical beam where light rays generated using a LED or the like as a light emission element are given narrow directionality with a lens optical system or the like may also be used.

Figure 2:
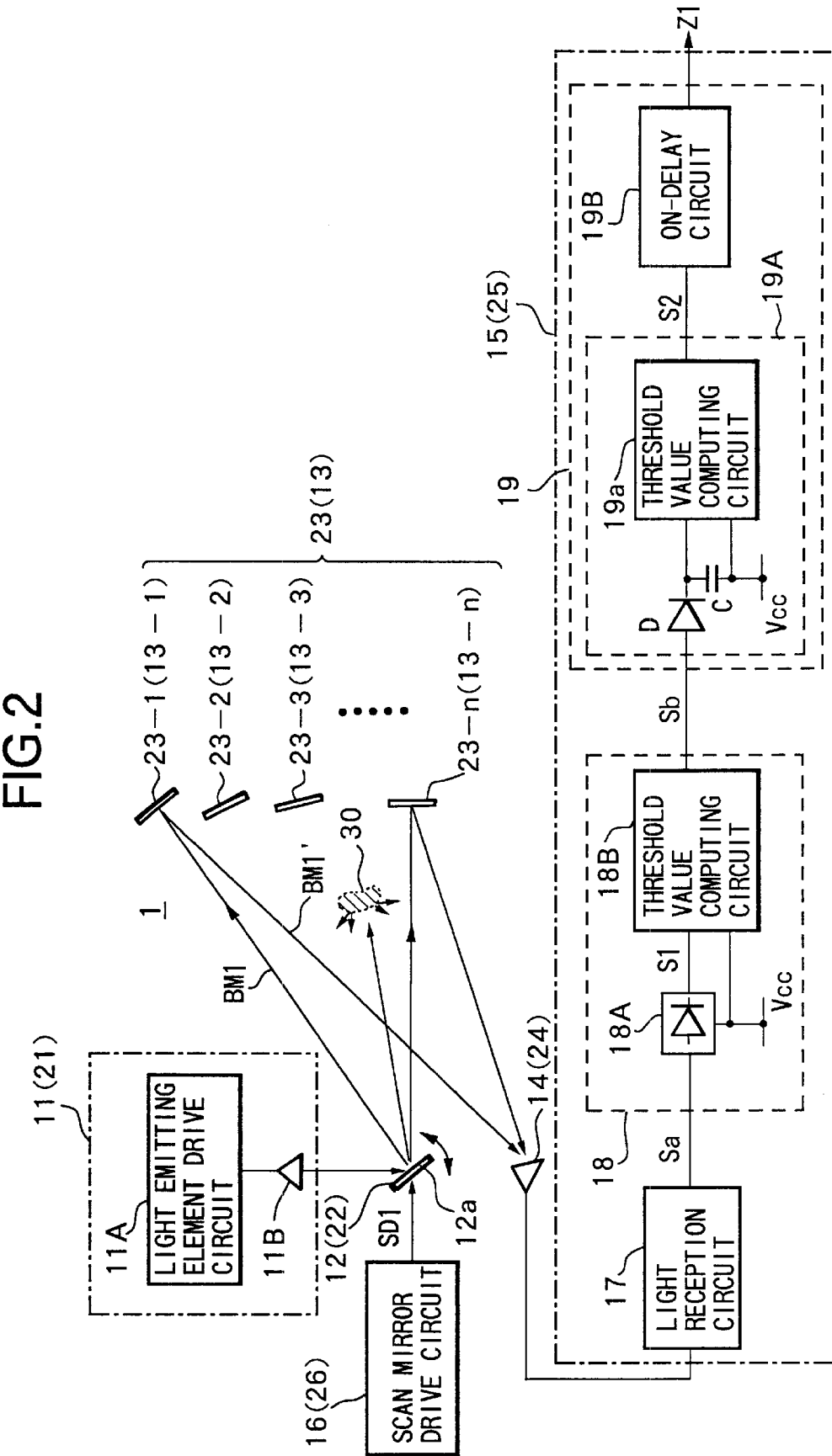
FIG. 2 is a configuration diagram of a unit of the first embodiment.

Referring to FIG. 2, the configuration of the first unit 10 will be described in detail.

In FIG. 2, the optical beam generating circuit 11 generates an optical beam from a light emitting element 11B by means of a light emitting element drive circuit 11A. By making the optical beam as a high frequency pulse emission, the influence of disturbance light such as sunshine can be effectively suppressed. For example, the light emitting element drive circuit 11A is made an oscillating circuit which uses for example an astable multivibrator, to blink the light emitting element 11B with an oscillation output from the astable multivibrator.

The scan mirror 12 reflects the optical beam incident from the light emitting element 11B to scan the same in a range of the predetermined spread angle. The scan mirror 12 is rotated at a predetermined period about a rotation axis 12a as shown by the arrow in the figure by means of a scan mirror drive circuit 16, so that the scanning beam BM1 reaches to each reflector 23-1 to 23-n of the other unit 20. The scan mirror 12 and the scan mirror drive circuit 16 constitutes optical beam scanning means.

The signal deficiency detection circuit 15 comprises a light reception circuit 17, a comparator 18, and a pulse deficiency detection circuit 19. The light reception circuit 17 amplifies the light reception signal from the light receiving element 14. The comparator 18 comprises a rectifying circuit 18A for performing an envelope detection on an output signal Sa from the light reception circuit 17, and a threshold value computing circuit 18B for computing a threshold value for a rectified output S1 from the rectifying circuit 18A, and when the level of the rectified output S1 of the signal Sa is equal to or above a threshold value Vt1, outputs Sb=1 (logic value 1), while when the level of the rectified output S1 is less than the threshold value Vt1, outputs Sb=0 (logic value 0). The pulse deficiency detection circuit 19 comprises an off-delay circuit 19A having a capacitor C, a diode D, and a threshold value computing circuit 19a having a threshold value Vt2, for delaying the falling of the signal Sb by a predetermined off-delay time Tof, and an on-delay circuit 19B for delaying the rising of the output S2 from the off-delay circuit 19A by a predetermined on-delay time Ton.

The second unit 20 also has the same construction as that of the first unit 10.

Figure 3:
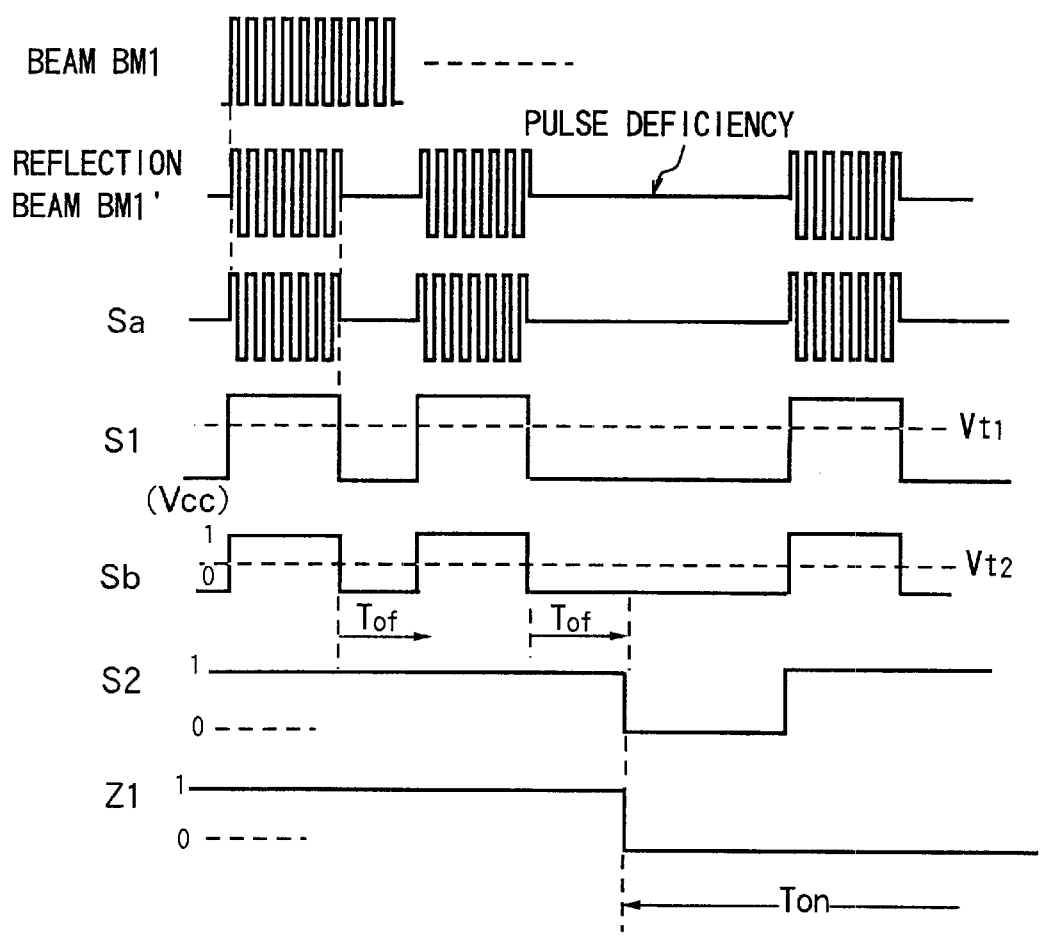
FIG. 3 is an operation time chart of the first embodiment.

Next is a description of an object detection operation of the present embodiment, based on a time chart of FIG. 3.

A high frequency optical beam is generated from the light emitting element 11B by the oscillating output from the light emitting drive circuit 11A. The optical beam is reflected by the scan mirror 12 so as to cross the detection area 1, and is incident on the second unit 20 as the scanning beam BM1. The scan mirror 12 is rotated at the predetermined period by the scan mirror drive circuit 16, so that the light projection direction of the scanning beam BM1 for scanning the detection area 1 changes by every moment, to thereby scan the detection area 1 with the scanning beam BM1. The scanning beam BM1 passes through the detection area 1 if an object 30 (shown in FIG. 2) is not present, and is successively incident on the reflectors 23-1 to 23-n of the second unit 20, and is then reflected so as to turn back at approximately 180 degrees (for convenience of explanation, in the figure, the scan mirror 12 and the light receiving element 14 are shown apart from each other with an angle between the scanning beam BM1 and scanning beam BM1'), and the scanning beam BM1' having passed through approximately the same path as the scanning beam BM1 is received by the light receiving element 14.

A light reception output from the light receiving element 14 is amplified by the light reception circuit 17 and input to the comparator 18 as the signal Sa. The signal Sa input to the comparator 18 is envelope detected by the rectifying circuit 18A and input to the threshold value computing circuit 18B as the signal S1. The threshold value computing circuit 18B compares the level of the signal S1 with the input threshold value Vt1, and if the signal S1 is equal to or above Vt1, generates Sb=1 (logic value 1), while if the signal S1 is a lower level than Vt1, generates Sb=0 (logic value 0). The output signal Sb from the comparator 18 is input to the off-delay circuit 19A inside the pulse deficiency detection circuit 19. The off-delay circuit 19A outputs a signal S2=1 coping with the rising (0→1) of the signal Sb, but continues the signal S2=1 for an off-delay time Tof without coping with the falling (1→0) of the signal Sb. Since the off-delay time Tof is set to be longer than the period where there is no light reception of the reflection beam BM1' produced at normal times, then if at normal times the object 30 is not present, then as shown in FIG. 3, the signal S2=1 is continued. If this continuous time is equal to or more than the on-delay time Ton of the on-delay circuit 19B, then Z1=1 is generated from the on-delay circuit 19B to notify of the absence of object 30.

As shown in FIG. 2, in the case where the object 30 is present in the detection area 1, since the scanning beam BM1 is blocked by the object 30, the reflection beam BM1' from the reflector positioned in the shadow of the object 30 does not appear. In this case, even if the light irregularly reflected by the object 30 is received by the light receiving element 14, the light reception level thereof is small. Consequently, the level of the signal S1 is a lower level than the threshold value Vt1 of the threshold value computing circuit 18B, so that the output from the comparator 18 becomes Sb=0. If this Sb=0 condition is continued for the off-delay time T of or more, signal S2=0 results, and the output from the on-delay circuit 19B becomes Z1=0, thus notifying of the presence of object 30.

Since the on-delay time Ton of the on-delay circuit 19B is set to be longer than one scanning period of the scanning beam BM1, Z1=0 generated once from the signal deficiency detection circuit 15 is held thereafter for at least more than one scanning period of the scanning beam BM1, and Z1=0 is continued provided S2=0 is continued in the next and subsequent scanning periods.

Also in the second unit 20, an operation similar to the above is performed. The notification output from the first unit 10 is made Z1, and a notification output from the second unit 20 is made 79, and both outputs Z1 and Z2 from the two units 10 and 20 are input to logical product computation circuits, and the logical product computation results becomes the final notification output Z for the optical barrier apparatus. As a result, the first unit 10 monitors the lower side triangular area of the detection area 1 of FIG. 1, while the second unit 20 monitors the upper side triangular area of the detection area 1, so that in total, a rectangular shape detection area 1 can be monitored.

With the abovementioned embodiment, the construction is such that the respective reflectors 13-1 to 13-n, and 23-1 to 23-n are arranged with a gap provided. Therefore, the reflection beam BM1' becomes intermittent so that the output signal Sb from the comparator 18 becomes a pulse signal. In the case where the reflectors 13-1 to 13-n and 23-1 to 23-n are arranged in succession without a gap, the signal Sb is not a pulse signal but becomes a continuous signal. In this case also, the presence/absence of object can be monitored by adopting the signal deficiency detection circuit of FIG. 2. Moreover, also if DC light is used for the optical beam rather than the high frequency pulse, only the rectifying circuit 18A of the comparator 18 becomes unnecessary, while the rest can be applied as is.

With the optical barrier apparatus of this construction, only one light receiving element need be provided for each unit 10 and 20, so that the number of light receiving elements and light receiving circuits can be significantly reduced, enabling a reduction in cost. Furthermore, the area between the units 10 and 20 can be monitored as a rectangular shape.

Figure 4:
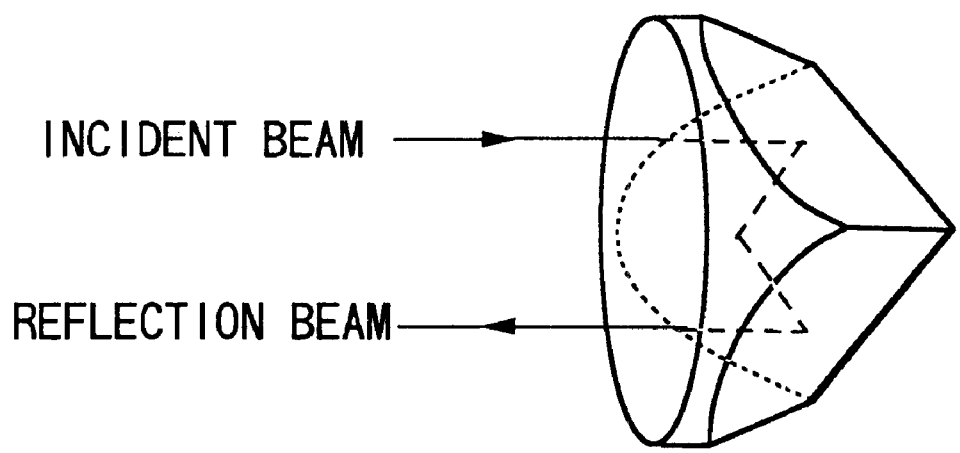
FIG. 4 is a diagram of a retroreflector.

In the case where each reflector 13-1 to 13-n and 23-1 to 23-n is a flat plate, if the spacing between the units 10 and 20 (that is the spacing between the scan mirrors 12, 22 and the reflector array 23, 13) is changed, then a deviation such as in the end point positions of the reflection beams occurs. Therefore in the case where the distance between the units 10 and 20 is changed, then each time, angle adjustment of each reflector 23-1 to 23-n and 13-1 to 13-n is necessary. However, if for the reflectors of each reflector array 13 and 23 a retroreflector as shown in FIG. 4 is used, this has the advantage that the scanning beam can be reflected back at 180 degrees, so that even if the spacing between the units 10 and 20 is changed, angle adjustment of the reflectors becomes unnecessary.

Incidentally, in the case of the optical barrier apparatus of the present invention where, as shown in FIG. 1, two units 10 and 20 are combined, the scanning range of the scanning beams is previously adjusted so that the scanning beam from one unit is not received by the light receiving element of the other unit. However, such a situation may arise where due to a change in the environment or the like, another scanning beam is received rather than the beam which should be received. For example, there is the case such as where the scanning beam BM2 from the scan mirror 22 of the second unit 20 is erroneously directly received by the light receiving element 14 of the first unit 10.

In such a case the following problem arises.

Figure 5A:
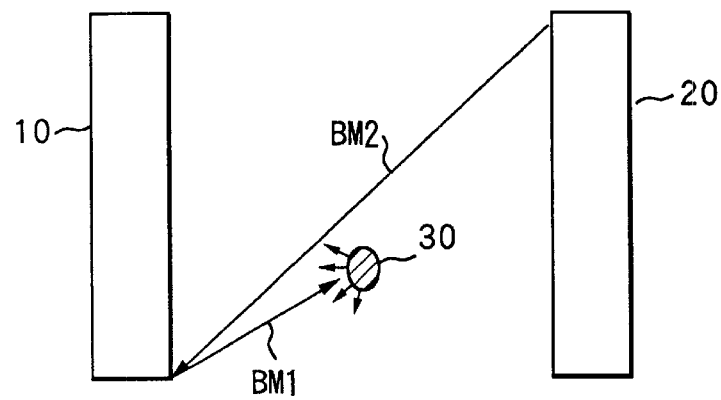
FIG. 5 is an explanatory diagram of problems of an optical barrier apparatus of the present invention, FIG. 5A being a diagram showing a condition where one scanning beam is blocked by an object while another scanning beam is received, and FIG. 5B being a time chart showing a light reception output condition for the case of FIG. 5A.
Figure 5B:
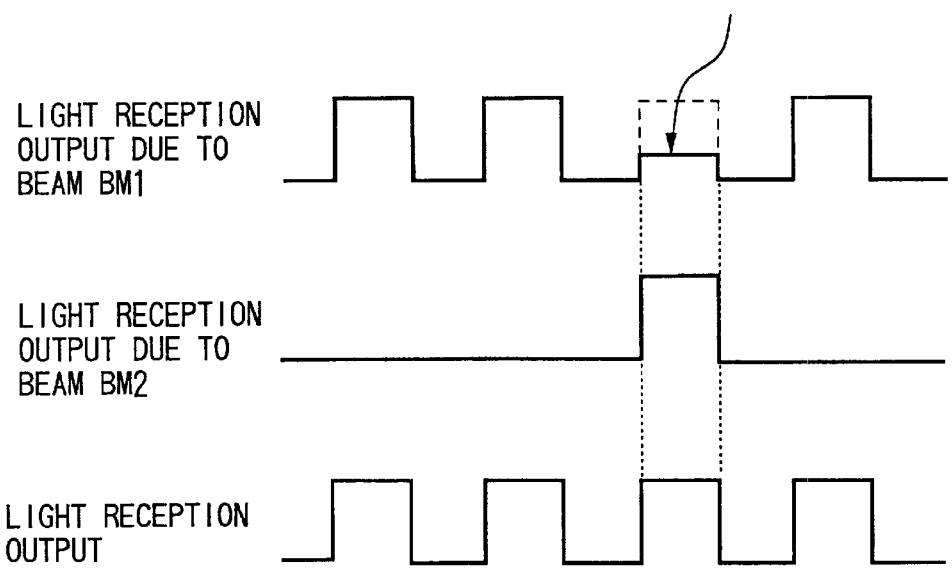

That is to say, there is the object 30 as shown in FIG. 5A. In this case, as mentioned before, the scanning beam BM1 on the first unit 10 side is blocked, so that the reflection beam from the reflector positioned in the shadow of the object 30 is not received by the light receiving element 14, and as shown by the dotted line in FIG. 5B, a pulse deficiency occurs in the light reception output for the scanning beam BM1. If at a timing where this pulse deficiency is covered up, the scanning beam BM2 from the scan mirror 22 on the second unit 20 side is directly received by the light receiving element 14 so that a light reception pulse is generated, the actual light reception output from the light receiving element 14, as shown in FIG. 5B becomes a signal without a pulse deficiency, similar to that at normal times. As a result, although the object 30 is present, absence of object 30 is notified.

Second to sixth embodiments for solving this problem are shown hereunder.

Figure 6:
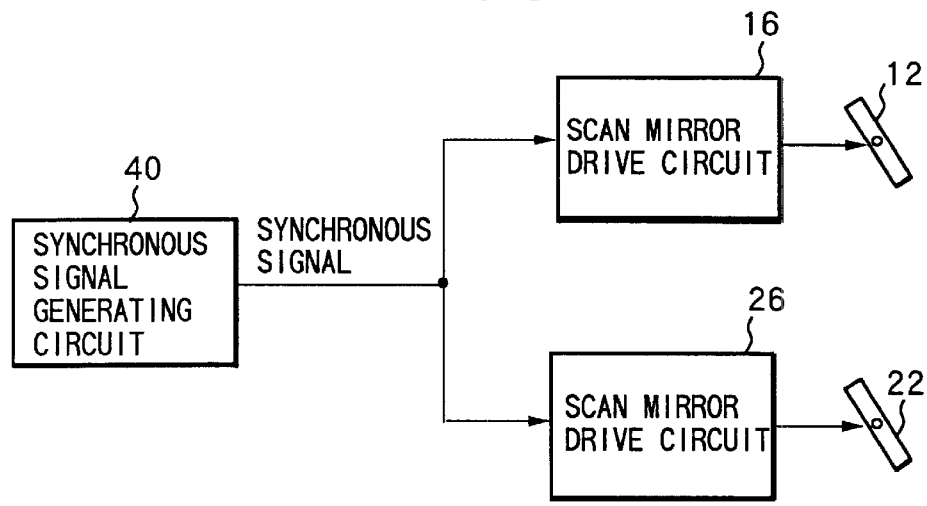
FIG. 6 is a configuration diagram of the main parts of a second embodiment of the present invention.
Figure 7:
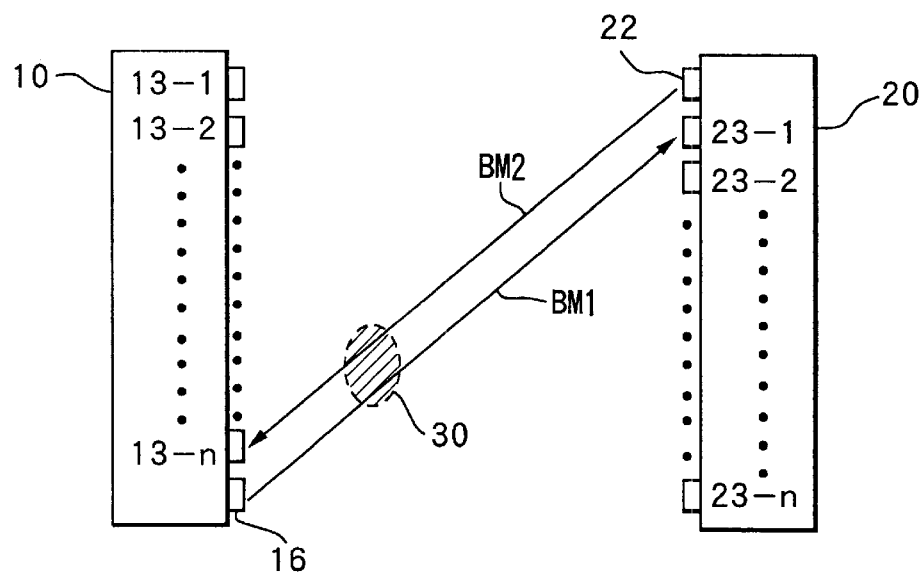
FIG. 7 is a diagram for explaining an operation of the second embodiment.

The second embodiment shown in FIG. 6 is constructed such that the scan mirror drive circuits 16 and 26 of the first and second units 10 and 20 are synchronized by a synchronous signal from a synchronous signal generating circuit 40 being synchronous drive means. That is, as shown in FIG. 7, the construction is such that the rotating operations of the scan mirrors 12 and 22 are synchronized with each other so that when the direction of the scanning beam BM1 on the first unit 10 side is a diagonal direction, the direction of the scanning beam BM2 on the second unit 20 side is also a diagonal direction. In FIG. 6, other construction is the same as for FIG. 2 and diagrams thereof are omitted.

The operation of the second embodiment will now be described.

When the scanning beam BM1 on the first unit 10 side is directed towards the reflector 23-1, the scanning beam BM2 on the second unit 20 side is directed towards the reflector 13-n. At this time, if the object 30 is not present on the optical axis, there is a possibility that the scanning beam BM2 is received by the light receiving element 14 on the first unit 10 side, and the scanning beam BM1 is received by the light receiving element 24 on the second unit 20 side. However, reception of the scanning beam due to object absence is no problem from the point of safety.

On the other hand, if as shown by the shaded portion in the figure, the object 30 is present on the optical axis, the scanning beams BM1 and BM2 are both blocked by the object 30 so that these do not reach the light receiving elements 24 and 14. Moreover, due to the presence of object 30, the scanning beams BM1 and BM2 do not both reach the reflectors 23-1 and 13-n. Therefore there is no light reception of the reflection beam. Consequently, neither of the light receiving elements 14 and 24 generates a light reception output, and the presence of object 30 is thus detected. Therefore, the presence of object 30 can be detected without error.

Figure 8:
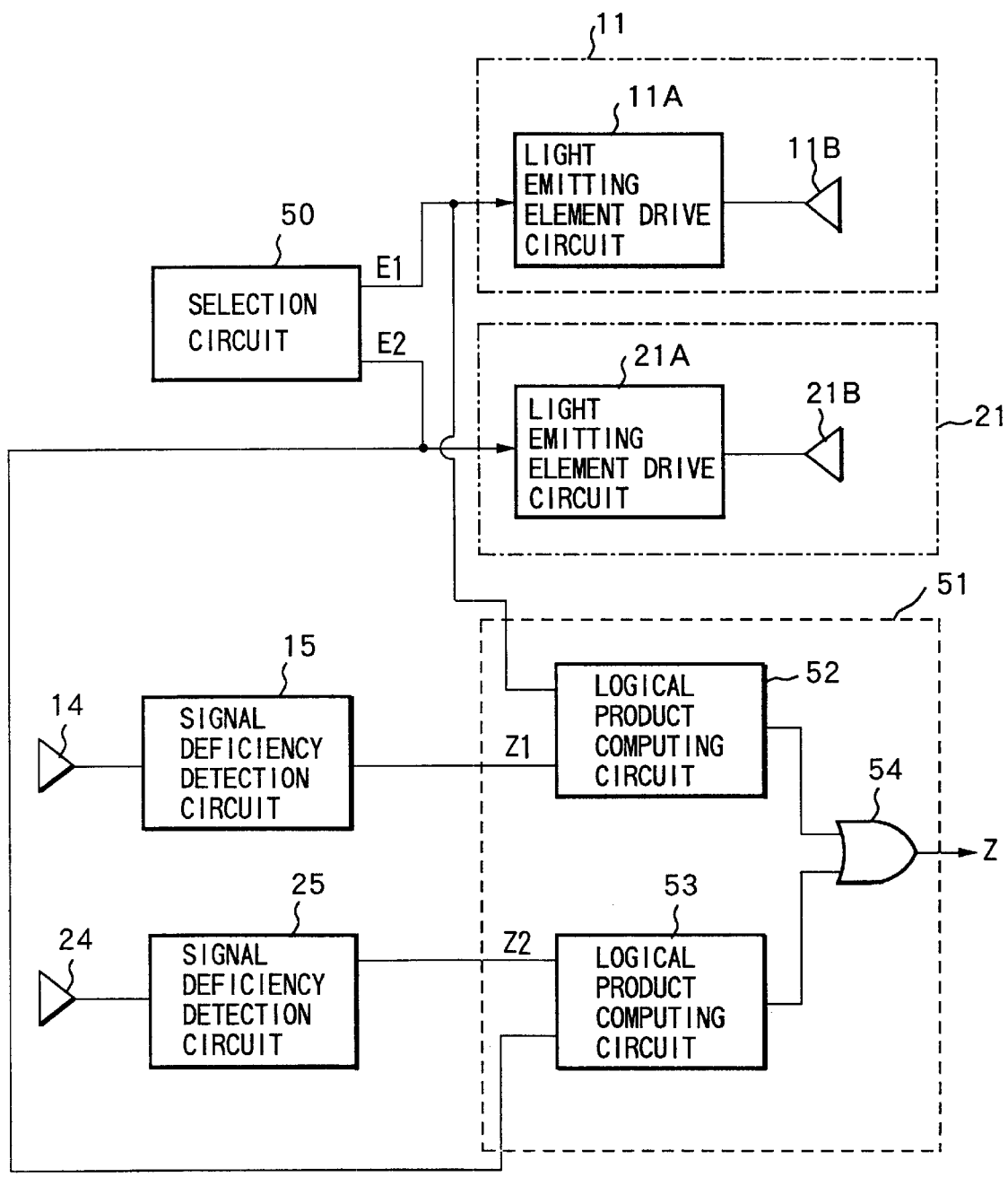
FIG. 8 is a configuration diagram of the main parts of a third embodiment of the present invention.

FIG. 8 shows the third embodiment of the present invention being a different construction example.

This embodiment is of a construction where the first and second units 10 and 20 are operated alternately by time sharing so as not to perform mutually duplicate object detection operations. In this way, while in one unit the scanning beam is being generated to perform object detection, the scanning beam of the other unit is not generated. Therefore the erroneous light reception described in FIG. 5 does not arise.

In FIG. 8, with the present embodiment, the construction is added with a selection circuit 50 serving as selection drive means, for generating selection signals E1 and E2 for selecting the unit to be driven, and a signal processing circuit 51 serving as signal selection means, for processing the light reception output.

The selection circuit 50 generates the selection signals E1 and E2 complementary to each other which do not simultaneously become logic value 1, and respectively supplies the selection signal E1 to the light emitting element drive circuit 11A of the optical beam generating circuit 11 of the first unit 10, and supplies the selection signal E2 to the light emitting element drive circuit 21A of the optical beam generating circuit 21 of the second unit 20.

The signal processing circuit 51 is constructed to comprise a first logical product computing circuit 52 for computing a logical product of the output from the signal deficiency detection circuit 15 of the first unit 10 and the selection signal E1, a second logical product computing circuit 53 for computing a logical product of the output from the signal deficiency detection circuit 25 of the second unit 20 and the selection signal E2, and a logical sum computing circuit 54 for computing a logical sum of the outputs from both logical product computing circuits 52 and 53, so that the output from the logical sum computing circuit 54 is an object detection output Z.

The operation will now be described.

When the selection signal E1 of the selection circuit 50 is logic value 1, an optical beam is generated from the light emitting element 11B of the first unit 10. At this time, the selection signal E2 is logic value 0, and the detection operation of the second unit 20 is stopped. On the other hand, when the selection signal E2 is logic value 1, an optical beam is generated from the light emitting element 21B of the second unit 20. At this time, the selection signal E1 is logic value 0, and the detection operation of the first unit 10 is stopped. Since the selection signals E1 and E2 do not simultaneously become logic value 1, the scanning beams BM1 and BM2 are not generated simultaneously.

The signal processing circuit 51, when the selection signal E1 is logic value 1, that is, only when the scanning beam BM1 is being generated, transmits the output Z1 from the signal deficiency detection circuit 15 to the logical sum computing circuit 54 as the output from the logical product computing circuit 52, to make the output Z1 effective. Moreover, when the selection signal E2 is logic value 1, that is, only when the scanning beam BM2 is being generated, the signal processing circuit 51 transmits the output Z2 from the signal deficiency detection circuit 25 to the logical sum computing circuit 54 as the output from the logical product computing circuit 53, to make the output Z2 effective.

With such a construction, even if the scanning beam BM1 on the first unit 10 side is directly received by the light receiving element 24 on the second unit 20 side, or even if the scanning beam BM2 on the second unit 20 side is directly received by the light receiving element 14 on the first unit 10 side, the outputs from the logical product computing circuits 52 and 53 do not become logic value 1 so that when an object is present, an erroneous output of object absence due to erroneous reception of a scanning beam on the other unit side is not generated.

If the scanning beams BM1 and BM2 are processed so as not to be received by the light receiving elements 24 and 14 on the other unit sides, respectively, then in the period where the scanning beam BM1 being generated, the output from the signal deficiency detection circuit 25 becomes Z2=0, while in the period where the scanning beam BM2 is being generated, the output from the signal deficiency detection circuit 15 becomes Z1=0. Therefore, in the signal processing circuit 51, the two logical product computing circuits 52 and 53 may be omitted, the logical sum computing circuit 54 only being sufficient, so that there is also no need to supply the selection signals E1 and E2.

Figure 9A:
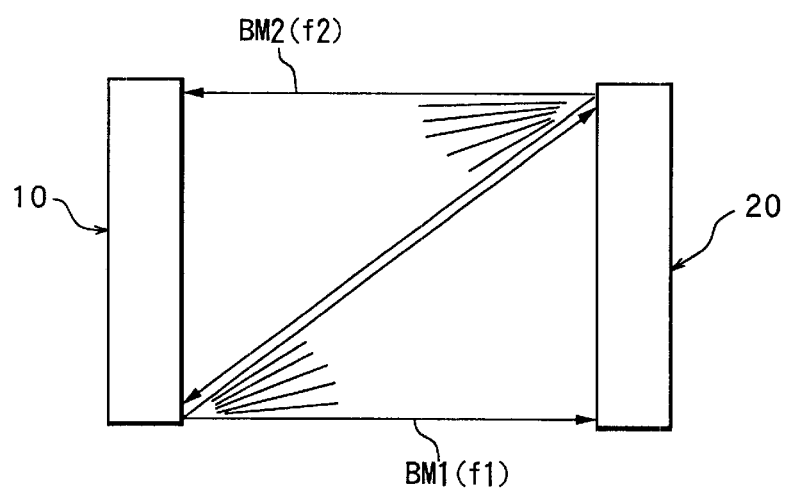
FIG. 9 is a configuration diagram of the main parts of a fourth embodiment of the present invention, FIG. 9A being a diagram of the scanning conditions of a scanning beam, and FIG. 9B being a configuration diagram of a signal deficiency detection circuit.
Figure 9B:
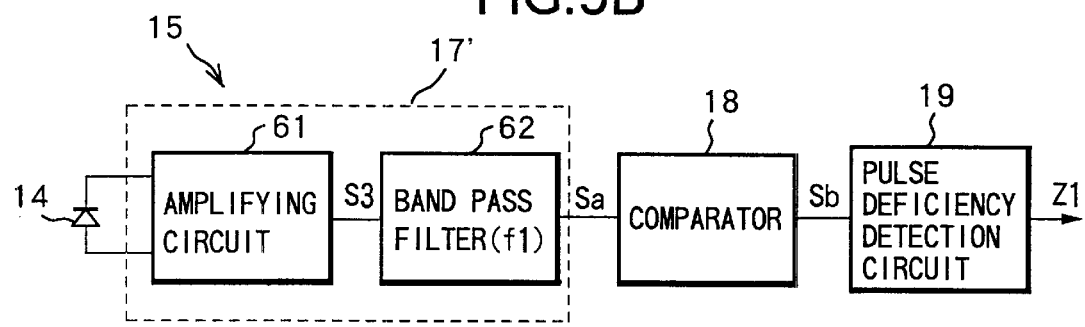

FIG. 9A and FIG. 9B show the fourth embodiment of the present invention being yet another construction example.

The fourth embodiment of the present invention shown in FIG. 9 is of a construction where the light emission frequency of the optical beam generated by the light emitting element 11B on the first unit 10 side is different from the light emission frequency of the optical beam generated by the light emitting element 21B on the second unit 20 side.

As shown in FIG. 9A, with this embodiment, the light emission frequency of the optical beam from the light emitting element 11B is made f1, and the light emission frequency of the optical beam from the light emitting element 21B is made f2 (f1≠f2).

FIG. 9B shows the construction of the signal deficiency detection circuit of this embodiment.

In the figure, a light reception circuit 17' of the signal deficiency detection circuit 15 of the first unit 10 has an amplifying circuit 61, and a band pass filter 62 of a central frequency fi serving as signal extraction means for extracting only scanning beam signal components of its own unit. The signal deficiency detection circuit 25 of the second unit 20, with the exception that the central frequency of the band pass filter inside the light receiving circuit is f2, is the same as that of the first unit 10 side, and hence this is omitted from the figure. Other construction is the same as for the first embodiment shown in FIG. 2.

The operation of the first unit 10 side will now be described with reference to a time chart of FIG. 10.

When the light receiving element 14 receives the reflection beam, the light reception circuit 17' amplifies the output signal from the light receiving element 14 in the amplifying circuit 61, and generates a light reception signal S3. The signal S3 is input to the band pass filter 62 to be frequency detected. The band pass filter 62 outputs the optical beam of light emission frequency f1 to be received by the light receiving element 14 with practically no attenuation. In this case, the level of the input signal S3 to the band pass filter 62 and the output signal Sa is Sa≈S3. The signal Sa is input to the comparator 18 to be level detected similarly to the case of the first embodiment of FIG. 2. If the rectified output S1 level of the signal Sa is equal to or above the threshold value Vt1, Sb=1 is generated, while if the signal S1 level is a lower level than Vt1, Sb=0 is generated.

The output signal Sb from the comparator 18 is input to the off-delay circuit 19A inside the pulse deficiency detection circuit 19, and if the reflection beam BM1' of frequency f1 is normally received, the signal S2=1 is continued, and when the continuation time becomes the on-delay time Ton of the on-delay circuit 19B or more, Z1=1 is generated from the on-delay circuit 19B to thus notify of the absence of object. If there is an object inside the detection area 1, a pulse deficiency as shown by the dotted line in FIG. 10 is produced, and if the signal Sb=0 is continued for the off-delay time Tof or more, S2=0 is generated and the output Z1 from the on-delay circuit 19B becomes Z1=0, thus notifying of the presence of object.

On the other hand, even if the optical beam BM2 of frequency f2 on the second unit 20 side, which is not to be received by the light receiving element 14, is received by the light receiving element 14 so that a signal S3 is generated, this signal S3 is frequency detected by the band pass filter 62 and removed. That is, the attenuation characteristic of the band pass filter 62 is set so that even if the signal S3 becomes a maximum level due to the light reception of the optical beam BM2 of emission frequency f2, the signal S1 level as shown in the figure becomes a level lower than the threshold value Vt1. As a result, the signal Sb=1 is not generated, so that the problem due to erroneous light reception of the scanning beam from the other unit can be avoided.

Figure 11A:
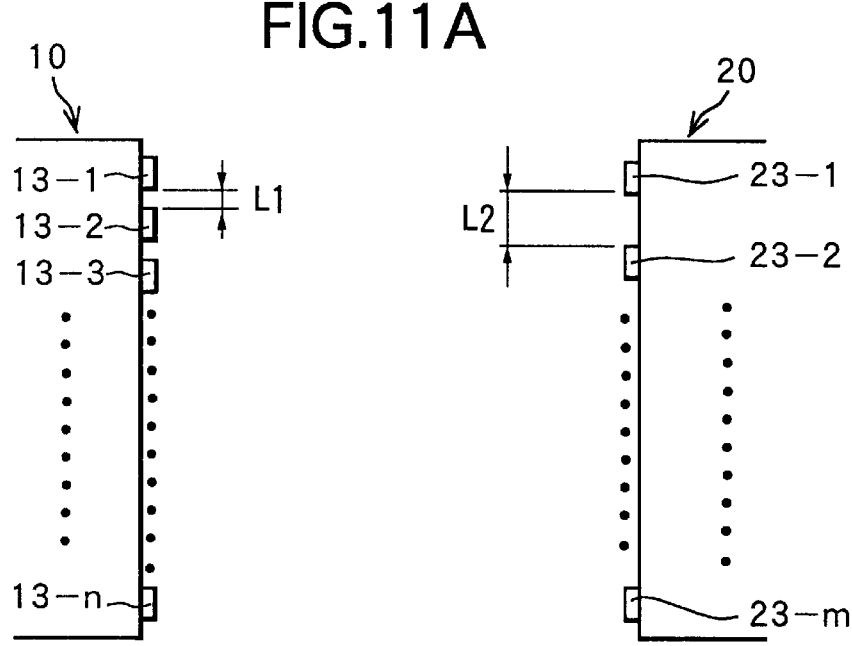
FIG. 11 is a configuration diagram of the main parts of a fifth embodiment of the present invention, FIG. 11A being a configuration diagram of a reflector array, and FIG. 11B being a time chart of a light reception output of each unit.
Figure 11B:
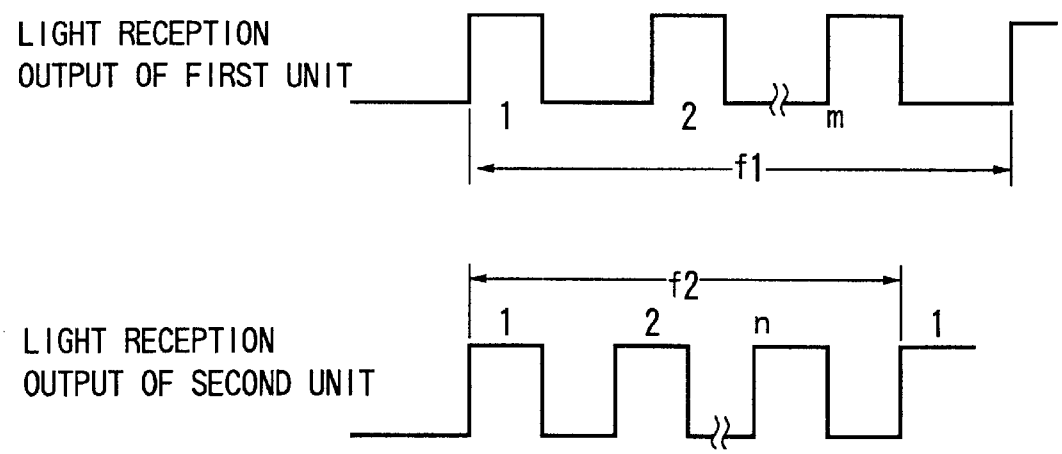

Furthermore, as with the fifth embodiment of the present invention shown in FIG. 11A, the construction may be such that the pitches L1 and L2 of the reflectors 13-1 to 13-$n$ and 23-1 to 23-$m$ in the reflector array 13 of the first unit 10 and the reflector array 23 of the second unit 20 is made different. In this case, as shown in FIG. 11B, the frequencies of the envelope detection signals of the respective light reception signals of the light receiving elements 14 and 24 in one scanning period, that is, the blinking frequencies of the reflection beams, become different. The signal deficiency detection circuit of this embodiment is the same as the circuit of FIG. 9B. However, the central frequencies f1 and f2 of the band pass filters 62 become the blinking frequencies of the reflection beams.

Figure 12:
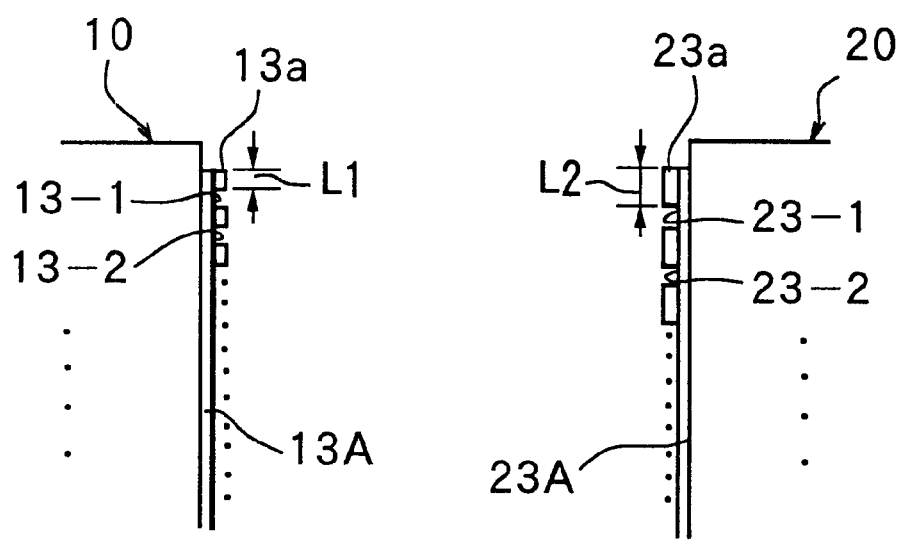
FIG. 12 is a configuration diagram of the main parts of a sixth embodiment of the present invention.

Moreover, as with the sixth embodiment of FIG. 12, also if the construction is such that masks 13$a$ and 23$a$ with widths L1 and L2 are attached at predetermined spacing on single plate reflectors 13$a$ and 23$a$, so that substantially a plurality of reflecting sections (in the figure shown as reflectors 13-1 to 13-$n$ and 23-1 to 23-$m$) are provided to make the reflector arrays 13 and 23, the operation and effect similar to those of FIG. 11 can be obtained.

Here, if reflectors (or reflecting sections) of the two units 10 and 20 are arranged in the same number, and the scanning speeds of the scan mirrors 12 and 22 are made different, the blinking frequency of the light reception output in the one scanning period of the two units 10 and 20 becomes different. Hence the operation and effect similar to those for the cases of FIG. 11 and FIG. 12 can be obtained. In the cases of FIG. 11 and FIG. 12, also if DC light is used in the scan beams BM1 and BM2, the influence from disturbance light such as from sunshine can be suppressed.

According to the constructions of the fifth and sixth embodiments in FIG. 11 and FIG. 12, an error as described later where the light reception strength of the irregularly reflected light from the object is large as if this is regarded just as reception light from the reflector (or reflecting section), can be avoided.

That is, in the fifth and sixth embodiments, the reflection beams from the reflector arrays 13 and 23 become blinking lights at predetermined frequencies f1 and f2 in the respective one scanning periods. On the other hand, when irregularly reflected light is received from the object, this type of blinking light is not generated. Consequently, light from the reflector array and irregularly reflected light can be discriminated, and if irregularly reflected light is present, the output from the signal deficiency detection circuit becomes logic value 0.

As a method for discriminating between the scanning beams BM1 and BM2, the wavelength of the scanning beams BM1 and BM2 may be made different. In this case, wavelength filters for passing only scanning beams BM1 and BM2 of respective wavelengths which should actually be received, and strength attenuating or blocking off scanning beams BM2 and BM1 of wavelengths which should not to be received, may be provided on the light receiving surfaces of the respective light receiving elements 14 and 24 of the units 10 and 20. In this way, erroneous light reception of scanning beams which should not to be received can be prevented. In the signal deficiency detection circuits 15 and 25 on the light receiving side, the construction of FIG. 2 may be used.

Figure 13A:
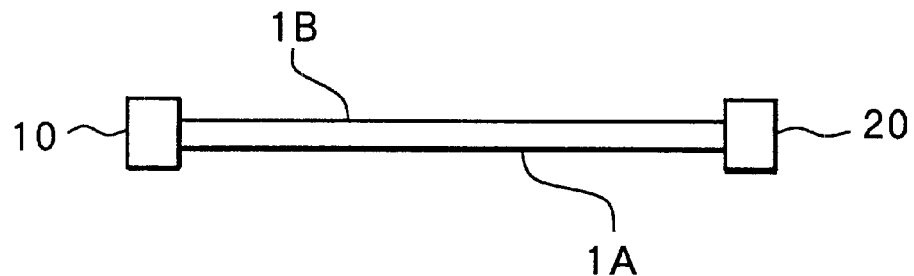
FIG. 13 is a diagram showing an example of another method for preventing direct reception of a beam from another unit, FIG. 13A being a top view of the optical barrier apparatus, and FIG. 13B being a front view of the optical barrier apparatus.
Figure 13B:
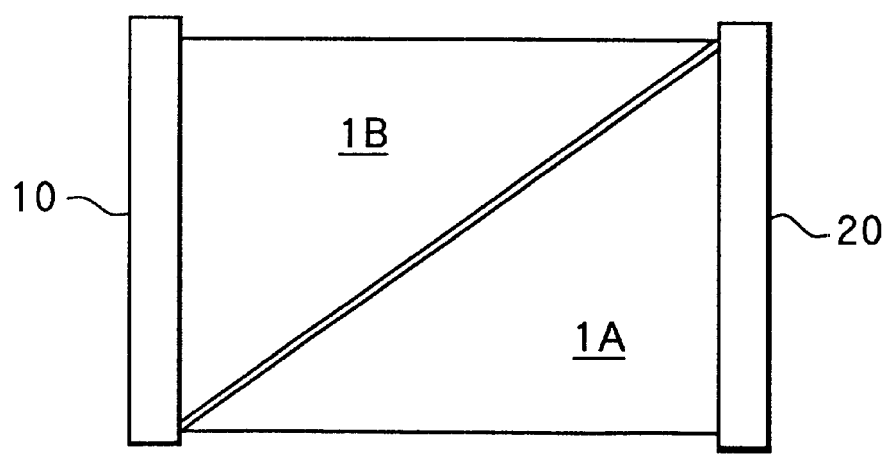

By devising a geometrical arrangement of detection area of approximately triangular shape in each unit, the problem of erroneous reception of scanning beam from the other unit can be resolved. In general, as shown in FIG. 13A and FIG. 13B, the respective scan mirrors and light receiving elements of the units 10 and 20 may be arranged so that the face of the triangular detection area 1A of the first unit 10, and the face of the triangular detection area 1B of the second unit 20 are not in the same plane. By arranging in this manner, direct reception of the scanning beam from the other unit can be prevented. FIG. 13A is a plan view and FIG. 13B is a front view.

Incidentally, in the case of an object with good reflectance (for example a mirror or the like), it is likely that, depending on the position of the object inside the detection area 1, the scanning beam is reflected back at 180 degrees by the object without scattering so that light of sufficient strength is received by the light receiving element. Furthermore, in the case where the object is present near the scan mirror and the light receiving element, then even if the scanning beam is scattered and reflected by the object, it is possible for this scattered light to be received by the light receiving element at a strength of the degree to erroneously show object absence.

An embodiment to resolve this problem is shown below.

Figure 14:
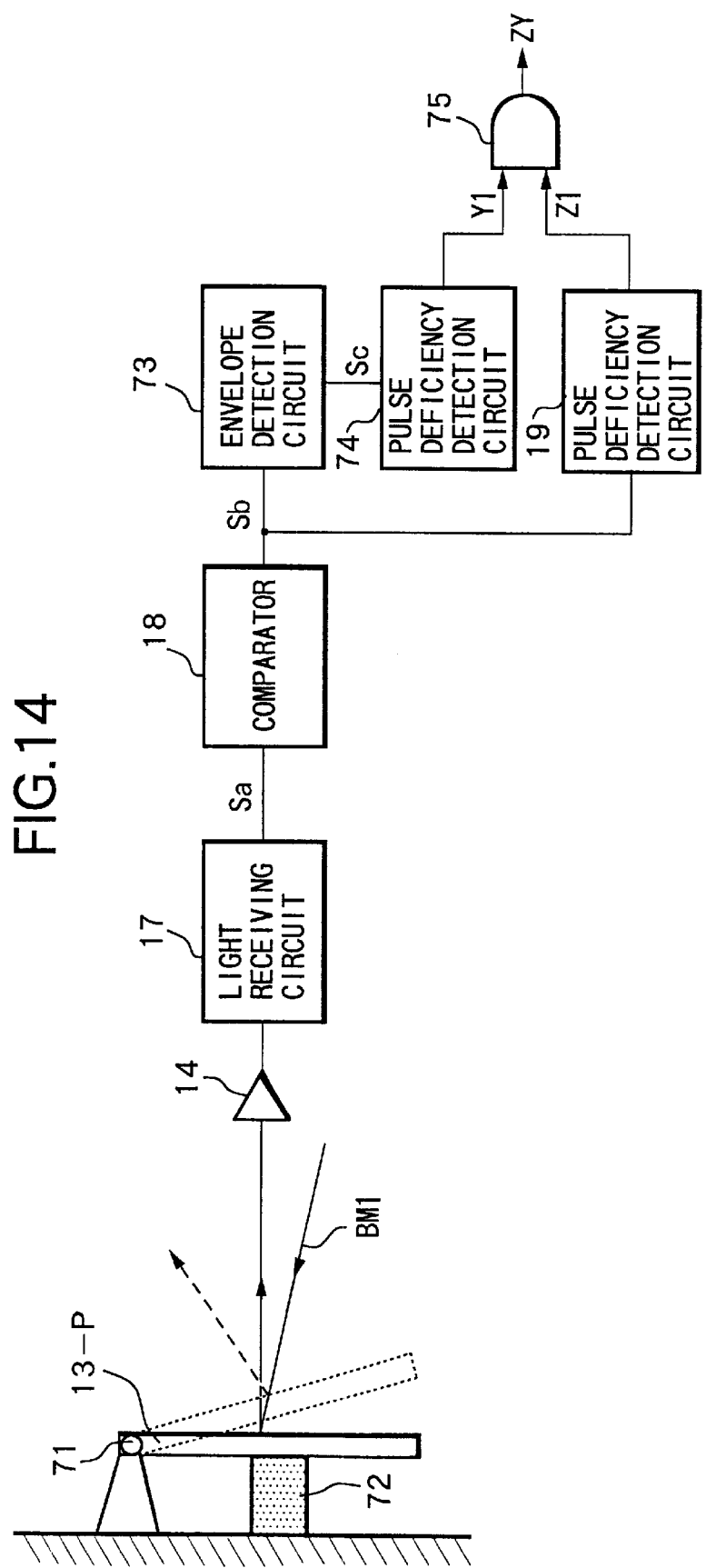
FIG. 14 is a configuration diagram of the main parts of a seventh embodiment of the present invention.

In a seventh embodiment shown in FIG. 14, the construction is such that there is provided a function for verifying that a reflection beam received by a light receiving element is one which is reflected by a reflector. The basic construction of FIG. 14 is known for example from Japanese Unexamined Patent Publication No. 10-38194.

In FIG. 14, with the present embodiment, at least one of the reflector arrays 13 is a specific reflector 13-P (P=1 to n), and the reflector 13-P has one end thereof rotatably supported by a pivot 71. An electrostrictive element 72 is attached to the other end as modulation means. The electrostrictive element 72 is AC driven at a frequency f3 by a drive circuit (not shown in the figure). On the other hand, in the signal deficiency detection circuit 15, to the construction of FIG. 2 there is newly added an envelope detection circuit 73, a pulse deficiency detection circuit 74, and a logical product computing circuit 75. The envelope detection circuit 73 is a rectifying circuit which envelope detects the output Sb from the comparator 18 and outputs Sc=1 only when the input signal frequency is a high frequency signal equal to or above f3. The pulse deficiency detection circuit 74 incorporates an off-delay circuit and an on-delay circuit, and detects a pulse deficiency of the output Sc from the envelope detection circuit 73. However, the off-delay time Tof1 of the off-delay circuit of the pulse deficiency detection circuit 74 is longer than this period for the output Sc=0 from the envelope detection circuit 73 which is normally generated and shorter than two periods for where Sc=1 is generated. Furthermore, the on-delay time of the on-delay circuit is set to be at least longer than the Sc=1 generating period. The second unit 20 side is also of the same construction.

Figure 15:
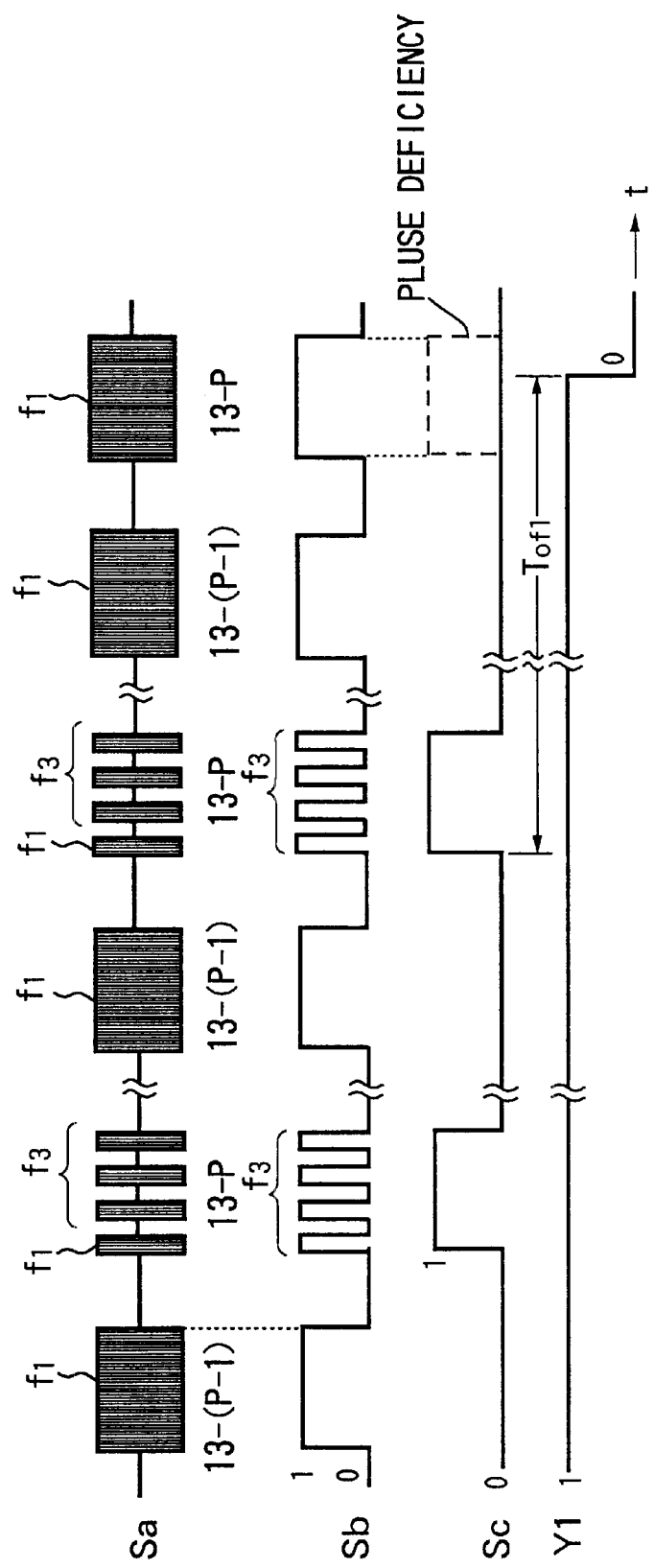
FIG. 15 is an operation time chart of the seventh embodiment.

Hereunder is a description of the operation with reference to a time chart of FIG. 15.

At the time of a monitoring operation, the reflector 13-P is AC driven by the electrostrictive element 72 at the frequency f3. When a voltage is not applied, the reflector 13-P becomes the condition shown by the solid line in FIG. 14. In this condition, the scanning beam BM1 is reflected in the direction of the light receiving element 14 and received thereby. When a voltage is applied, the reflector 13-P becomes the condition shown by the dotted line in FIG. 14. In this condition, the scanning beam BM1 is not reflected in the direction of the light receiving element 14 and is thus not received. Consequently, if the drive frequency of the electrostrictive element 72 is f3, the light reception output from the light receiving element 14 based on reception of the reflection beam from the reflector 13-P, repeats alternately at the frequency f3 between reception and non reception. As a result, regarding the output signal Sa from the light reception circuit 17 based on reception of the reflection beam from the reflector 13-P, as shown in FIG. 15, the signal of frequency f1 becomes a waveform with the amplitude modulated at frequency f3. This gives the relationship (reception period of reflection beam from reflector 13-P)>1/f3>1/f1.

Since the scanning beam BM1 is scanned at a predetermined period, then at normal times, the modulating signal due to the reflector 13-P also is periodically generated as shown in FIG. 15. Of the output signals Sb from the comparator 18, the signal of frequency f3 is detected by the envelope detection circuit 73 and output as Sc=1. If Sc=1 is periodically generated, the pulse deficiency detection circuit 74 continues to generate an output Y1=1. Moreover, in the case where the reflection beam from the reflector 13-P is not received, the signal of frequency f3 is not generated in the signal Sb. Therefore, the output from the envelope detection circuit 73 becomes Sc=0, and a pulse deficiency is produced as shown by the dotted line in FIG. 15. As a result, the output from the pulse deficiency detection circuit 74 becomes Y1=0. This signal Y1 and the output Z1 from the pulse deficiency detection circuit 19 are subjected to logical product computation by the logical product computing circuit 75, and the resultant output ZY becomes a signal indicating the presence/absence of object on the first unit 10 side.

Also in the case where the abovementioned modulation means such as an electrostrictive element is attached to a plurality of reflectors of the reflector array, the circuit configuration of FIG. 14 can be used. Moreover, if the construction is such that the modulation means is attached to all of the reflectors to modulate the scanning beam at the same frequency f3, then even when the optical beam is direct current light, this becomes alternating current light of frequency f3 when received. Therefore, it is not necessary to make the emission frequency f1. Furthermore, if the modulation means is attached to all the reflectors on the second unit 20 side so that the scanning beam BM1 is modulated at frequency f3, and similarly on the first unit 10 side so that the scanning beam BM2 is modulated at a frequency different from f3, then as with the fourth embodiment of FIG. 9, the problem of erroneous light reception of scanning beam by another unit side can also be resolved. In this case, the circuit of FIG. 9B may be used in the reception circuit of the signal deficiency detection circuit.

Figure 16:
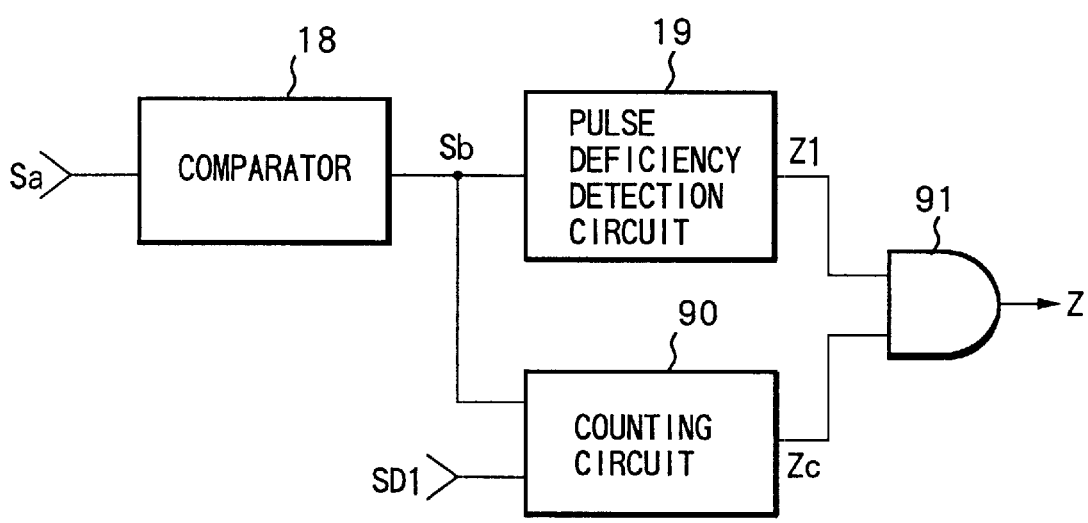
FIG. 16 is a configuration diagram of the main parts of an eighth embodiment of the present invention.

Next an eighth embodiment of the present invention being another construction example is shown in FIG. 16 and will be described. This embodiment is applied to the case where the optical beam reflecting means is constructed at a plurality of divided reflecting areas, that is, where a reflecting portion and a non reflecting portion are multiply arranged alternately. For example, this embodiment is applied to the case where this is constructed with a plurality of reflectors, or the case where a plurality of masks as shown in FIG. 11 and FIG. 12 are provided. Here, the description is for the case where the reflector array comprises a plurality of reflectors.

In FIG. 16, there is provided a counting circuit 90 input with the output Sb from the comparator 18 of the signal deficiency detection circuit 15 of FIG. 2, and the drive signal SD1 from the scan mirror drive circuit 16, for counting the number of generations of the signal Sb per one scanning period of the scan mirror 12. The construction is such that an output Zc from the counting circuit 90 and the output Z1 from the signal deficiency detection circuit 15 (the output from the pulse deficiency detection circuit 19) are computed by a logical product computation circuit 91, and an output from the logical product computation circuit 91 becomes a detection signal Z1 for object presence/absence.

In the case where as shown in FIG. 1, the reflector arrays 13 and 20 comprise the plurality of divided reflectors 13-1 to 13-n and 23-1 to 23-n, the number of pulses of the reflection beams received in one scanning period of the scanning beam is equal to the number of reflectors of the reflector arrays 13 and 23. If an object is present, at least one or more reflection beams is not received, and hence the number of pulses of reflection beams is decreased. Furthermore, in order to prevent the error where due to the large light reception strength of the irregularly reflected light from the object, it is considered that there is reception light, if the spacing of adjacent reflectors is set narrow so that the irregularly reflected light from the smallest object to be detected is continued for the amount of the reflected light from two or more reflectors, the number of pulses of reflection beams is decreased.

Regarding the operation, the counting circuit 90 counts the number of signals Sb input per one scanning period of the scan mirror 12 based on the signal SD1, and compares this count value with a set value previously set corresponding to the number of reflectors. If the count value coincides with the set value, the counting circuit 90 outputs Zc=1. If the count value does not coincide with the set value, the counting circuit 90 outputs Zc=0. The verification signal Zc of this pulse number and the output Z1 from the pulse deficiency detection circuit 19 are input to the logical product computation circuit 91, and an output Z of the computation result thereof becomes a detection signal for object presence/absence.

The counting circuit used in this embodiment has a function the same as the pulse deficiency detection circuit 19, since this counts the pulse number per one scanning period of the scan mirror. Therefore, the pulse deficiency detection circuit 19 in each of the aforementioned embodiments may be replaced by the counting circuit 90.

Furthermore, the method for detecting the frequency of the pulse signal generated as signal Sb may also be adopted. As also mentioned in the description for the aforementioned fifth and sixth embodiments, the reflected pulse light of frequency f1 to be received due to an object absence, if an object is present, does not occur while the object is being scanned by the scanning beam. That is, due to an object presence, the frequency of the reflected light becomes outside the frequency f1. Hence by performing frequency detection of the reception light signal, the presence/absence of object can be detected. The blinking frequency of the reflected light for the units 10 and 20 may be the same, if for example problems due to receiving scanning beam light from other units are not considered.

Regarding the frequency test, for example, the construction may be such that, in FIG. 16, a band pass filter (central frequency f1) is provided and the signal Sb input thereto, and the output therefrom input to a separately provided comparator and subjected to threshold value computation, and the output then input to the pulse deficiency detection circuit 19 (in this case, the counting circuit may naturally be omitted).

Figure 10:
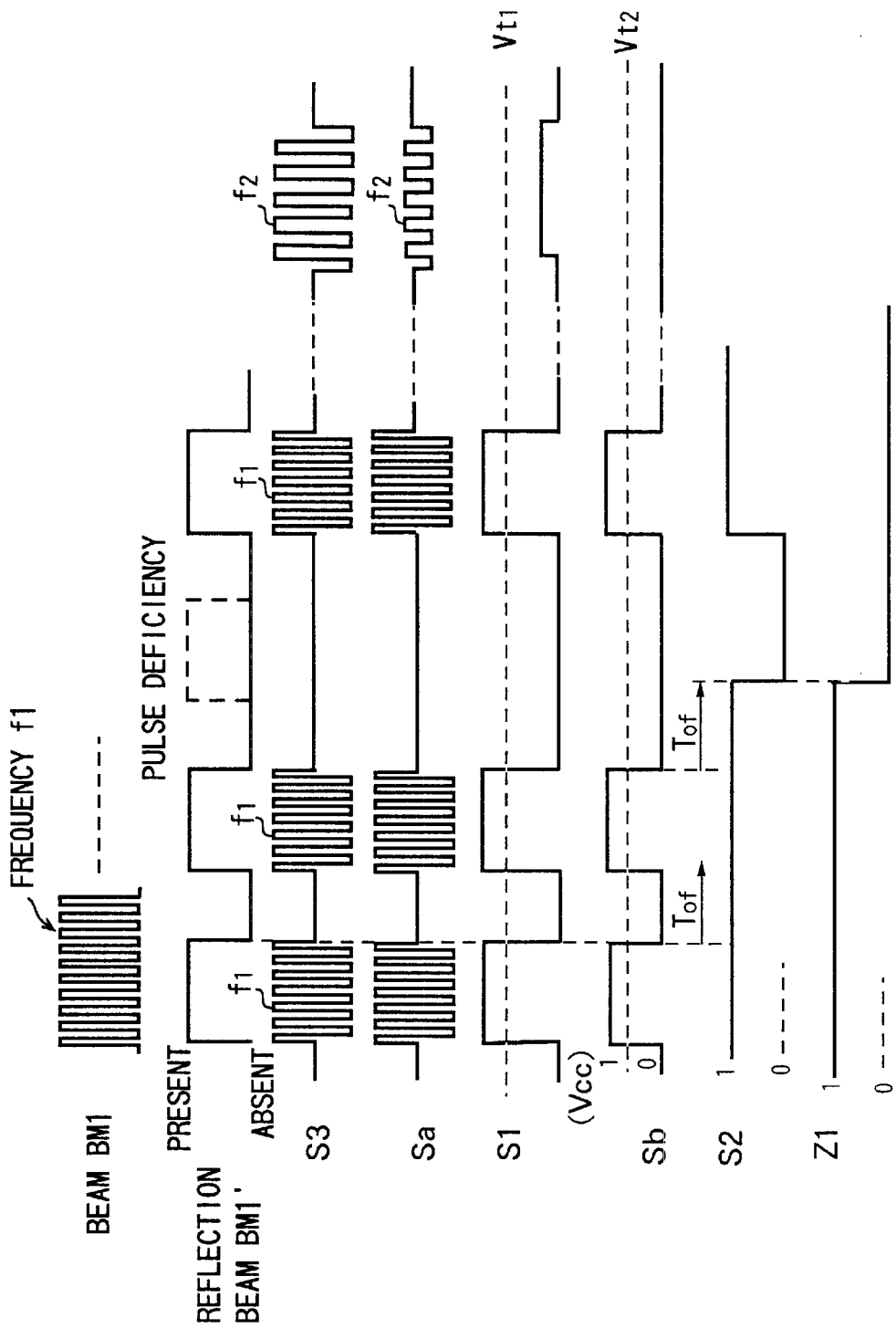
FIG. 10 is an operation time chart of the fourth embodiment.

If the frequency of the signal Sb becomes outside f1 due to an object presence, then as in FIG. 10, the filter output level drops to become lower than the threshold value of the comparator so that a pulse deficiency occurs and the object presence can be detected. Alternatively, using the circuit of FIG. 9B with the emitted beam as direct current light, the frequency of the reflection beam may be detected.

Figure 17A:
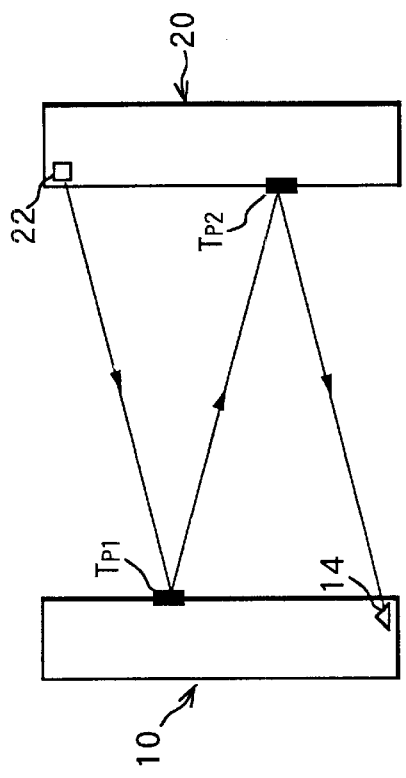
FIG. 17 is a configuration diagram of the main parts of a ninth embodiment of the present invention, FIG. 17A being a configuration example for receiving a scanning beam except for its own, and FIG. 17B being a configuration diagram of a circuit of a unit.
Figure 17B:
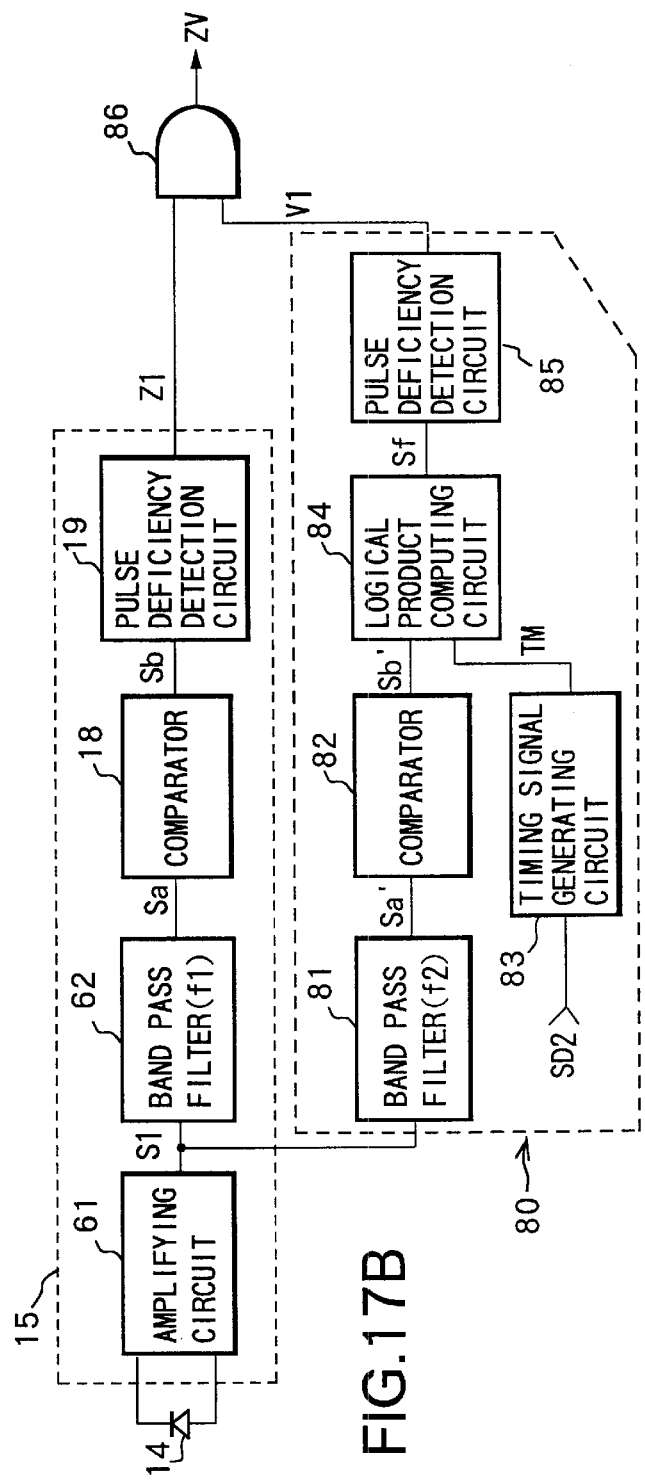

FIG. 17A and FIG. 17B show a ninth embodiment of the present invention being yet another configuration example.

In FIG. 17, with this embodiment, as shown in FIG. 17A, the construction is such that reflectors Tp1 and Tp2 are separately provided so that when an optical beam other than that of the own unit, for example the scanning beam BM2 of the second unit 20 side, is projected in a predetermined direction, this optical beam BM2 is reflected so as to be received by the light receiving element 14 on the first unit 10 side. To this end, as shown in FIG. 17B, the construction is such that on the light reception side, in addition to the signal deficiency detection circuit 15 of the construction of FIG. 9B, there is provided an other beam reception verification circuit 80 for verifying that the scanning beam BM2 of frequency f2 is being received at a predetermined period by the light receiving element 14.

The other beam reception verification circuit 80 comprises a band pass filter 81 with a central frequency f2, a comparator 82, a timing signal generating circuit 83 for outputting a timing signal TM with input of a scan mirror drive signal SD2 of the second unit 20 side, a logical product computing circuit 84, and a pulse deficiency detecting circuit 85, and when the scanning beam BM2 is normally received by the light receiving element 14 at a predetermined timing, generates an output V1=1.

The operation of the ninth embodiment will be described with reference to a timing chart of FIG. 18.

When a light reception output is generated from the light receiving element 14 on reception of the reflection beam, the light reception signal S1 amplified by the amplifying circuit 61 is respectively input to the band pass filters 62 and 81. As described for the fourth embodiment of the FIG. 9, signals outside the frequency f1 are attenuated by the band pass filter 62 and output to the comparator 18 as the signal Sa, and level detected by the pulse deficiency detection circuit 19. On the other hand, the band pass filter 81 of the other beam reception verification circuit 80 attenuates the signals outside the frequency f2 and outputs to the comparator 82 as a signal Sa'. With this embodiment, the light receiving element 14 and the amplifying circuit 61 are not saturated even if the two scanning beams BM1 and BM2 are simultaneously received by the light receiving element 14.

The timing signal generating circuit 83 of the other beam reception verification circuit 80 outputs a timing signal TM with input of a drive signal SD2 indicating that the scan mirror 22 on the second unit 20 side has been driven to a scanning position which becomes the path of the reflectors Tp1 and Tp2 and the light receiving element 14 shown in FIG. 17A. If, at this timing, the scanning beam BM2 is normally reflected by the reflectors Tp1 and Tp2 and received by the light receiving element 14, then as shown in FIG. 18, Sa'=1 is generated from the band pass filter 81, Sb'=1 is generated from the comparator 82, and Sf=1 is generated from the logical product computing circuit 84. If the timing signal TM=1 is periodically produced, and at this time Sb'=1 is generated, then Sf=1 is periodically generated from the logical product computing circuit 84. The pulse deficiency detecting circuit 85, when Sf=1 is generated at a predetermined period, generates V1=1. Here, the off-delay time Tof2 of the off-delay circuit of the pulse deficiency detecting circuit 85 is longer than the period for the output Sf=0 generated from the logical product computing circuit 84 when normal time and shorter than two periods for Sf=1 generation. Furthermore, the on-delay time of the on-delay circuit is set to be at least longer than the Sf=1 generation period.

Figure 18:
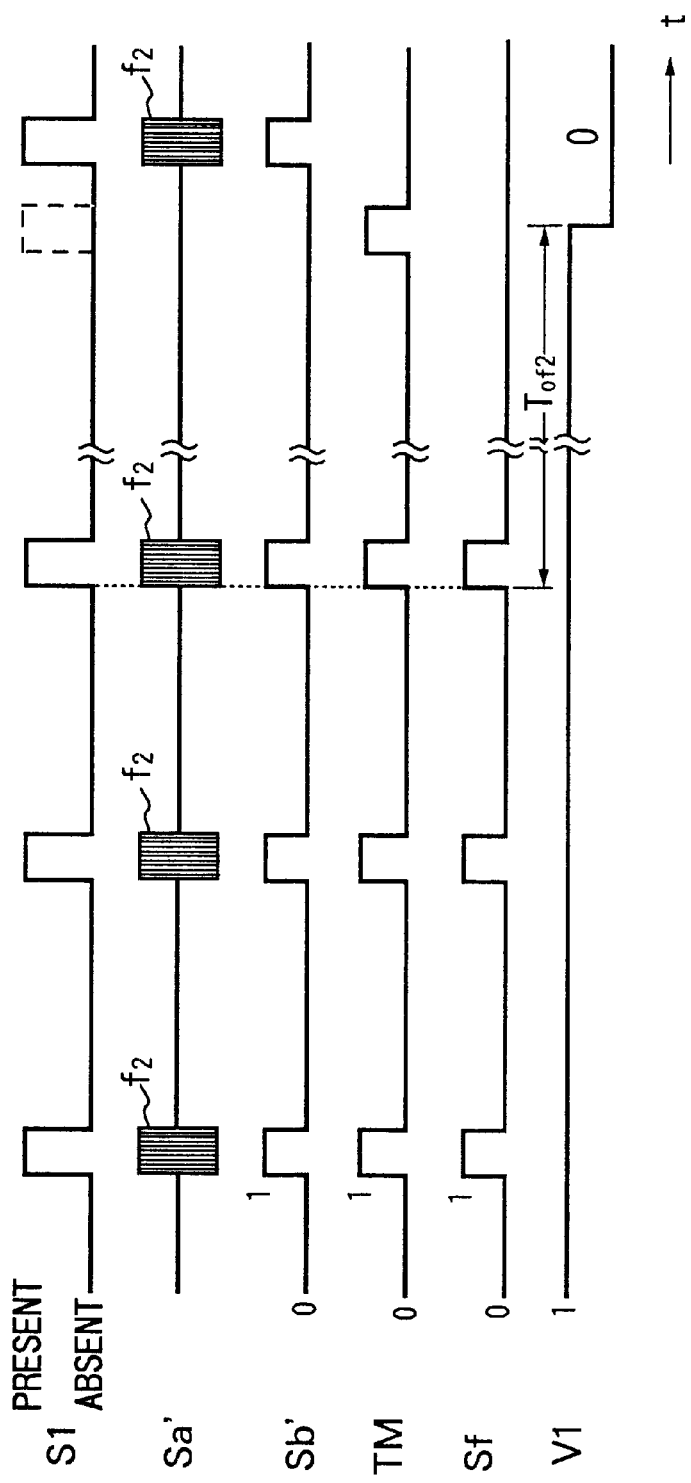
FIG. 18 is an operation time chart of the ninth embodiment.

On the other hand, if the scanning beam BM2 is not received at the generating time of the timing signal TM=1 in which the scanning beam BM2 should be received as shown by the dotted line in FIG. 18, Sf=1 is not generated from the logical product computing circuit 84 so that a deficiency occurs in the pulse, and the output from the pulse deficiency detecting circuit 85 becomes V1=0. This signal V1 and the output Z1 from the signal deficiency detection circuit 15 are subjected to logical product computation by the logical product computing circuit 86, and the resultant output ZV is made a signal indicating the presence/absence of object on the first unit 10 side.

With such a construction, if an object is present on an optical path so that the scanning beam BM2 is blocked, V1=0 results, and the output from the logical product computing circuit 86 becomes ZV=0 indicating the presence of object. Furthermore, with a configuration provided with such an optical path, if the positions of the two units 10 and 20 are displaced from the normal position, the scanning beam BM2 is not incident exactly onto the light receiving element 14, and hence is not received. Therefore, this is also applicable to alignment of the two units 10 and 20.

In FIG. 17, the case for one optical path is shown, however, reflectors may be added so that a plurality of optical paths are provided. In this case, the timing signal TM=1 is generated for each timing at which the scanning beam BM2 should be received. Hence TM=1 is generated several times during one scanning period of the scan mirror 22. Furthermore, instead of using the scanning beam BM2, a dedicated light emitting element for generating an optical beam having a frequency different to those of the scanning beams BM1 and BM2 may be provided so as to form an optical path. Moreover, if the construction is such that light is continuously received, then the timing signal generating circuit 83 and the logical product computing circuit 84 become unnecessary.

The aforementioned ninth embodiment has been constructed using an optical beam of a frequency different to that of the scanning beam BM1. However, it is also possible to make the wavelengths of the optical beams different. In this case, since the light receiving elements cannot be shared, this may be processed with a construction where a separate light receiving element and a separate amplifying circuit are provided and the two beams are separately received.

Next is a description of a suitable embodiment for use of the optical barrier apparatus of the present invention as a safety ensuring facility for a machine.

In order to use the optical barrier apparatus of the present invention as a safety ensuring facility for a machine, it is desirable to verify that the scanning beams BM1 and BM2 are reliably scanning the detection area 1.

Figure 19:
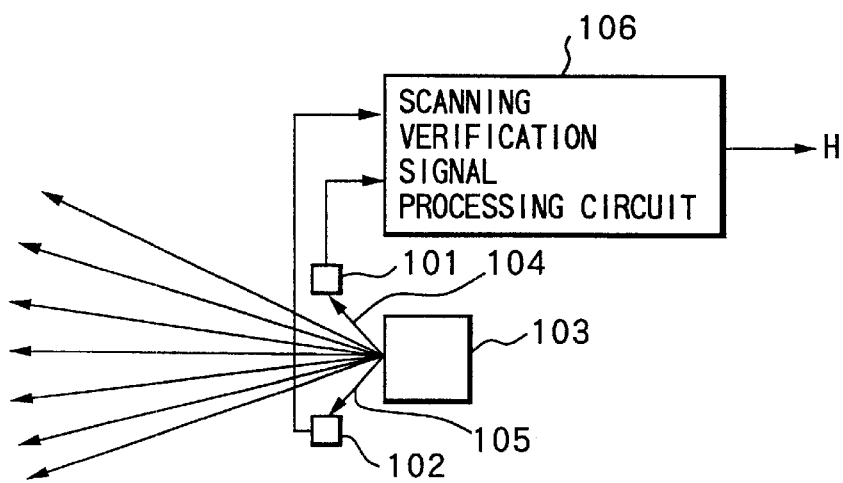
FIG. 19 is a configuration diagram of a scanning verification section.
Figure 20:
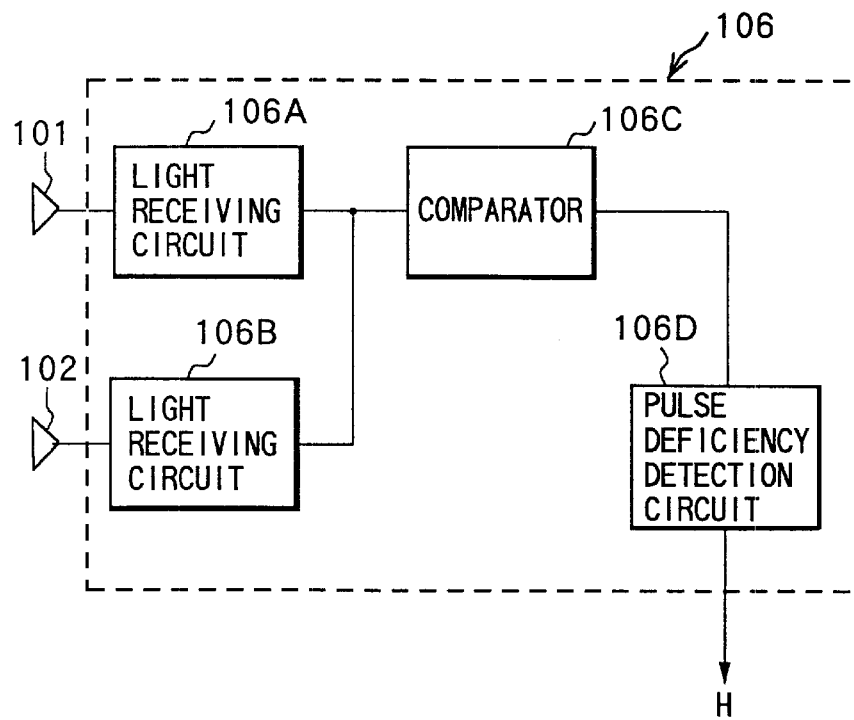
FIG. 20 is a block diagram of the scanning verification section.
Figure 21:
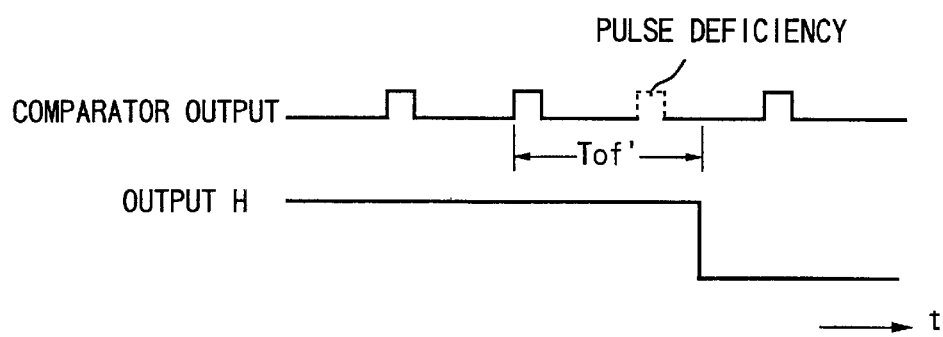
FIG. 21 is an operation time chart of the scanning verification section.

FIG. 19 through FIG. 21 show a configuration example of a scanning verification section serving as scanning verification means for performing such verification. This scanning verification section verifies that a scanning mirror is scanning an optical beam within a range of a predetermined spread angle.

FIG. 19 shows a configuration example of the scanning verification section, FIG. 20 shows a block diagram of the scanning verification section, and FIG. 21 shows an operation time chart for the scanning verification section. The configuration of this scanning verification section is already known in PCT International Publication No. WO97/33186, and will be described briefly here.

In FIG. 19, reference numerals 101 and 102 denote a pair of scanning verification light receiving elements, arranged outside of the detection area, which receive optical beams 104 and 105 reflected to outside of the detection area by a scan mirror 103. Reference numeral 106 denotes a scanning verification signal processing circuit being scanning verification signal deficiency detecting means, supplied with outputs from the scanning verification light receiving elements 101 and 102 to the input side thereof. The scanning verification signal processing circuit 106, as shown in FIG. 20, is constructed of a circuit the same as the signal deficiency detection circuit 15 of FIG. 2, comprising light receiving circuits 106A and 106B, a comparator 106C, and a pulse deficiency detection circuit 106D, to detect an abnormality of the scanning by an optical beam, from a pulse deficiency in the signal from the light receiving elements 101 and 102.

FIG. 21 shows an operation time chart.

In the case where there is no reflection of the optical beam by the scan mirror 103, or the scan mirror 103 does not rotate, or a fault such as reduction of rotation angle of the scan mirror 103 occurs, the output from at least one of the light receiving elements 101 and 102 is lost, and as shown by the dotted line in the figure, a pulse deficiency occurs. Since an off-delay time Tof' of then off-delay circuit inside the pulse deficiency detection circuit 106D is set to be slightly longer than the generation period of the light reception output, then when a pulse deficiency occurs, the output from the pulse deficiency detection circuit 106D changes from H=1 to H=0, and while the fault as described above is continued so that the pulse deficiency periodically occurs, H=0 is maintained, and the optical beam scanning abnormality is notified. In order to prevent automatic normal notification even when the abnormality is no longer detected after the abnormality has once occurred, then for example the signal H may be input to a flip-flop so that H=0 is stored.

Figure 22:
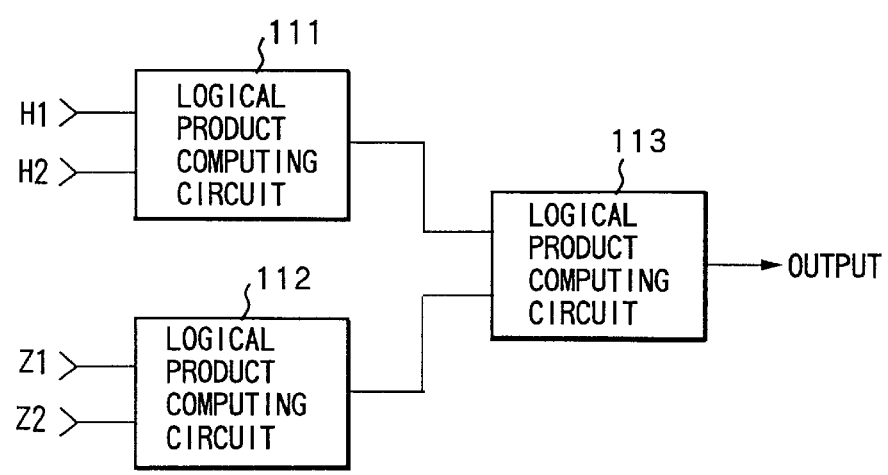
FIG. 22 is a configuration diagram of the main parts for the case where the scanning verification section is applied to the optical barrier apparatus of the present invention.

In the case where such a scanning verification section is applied to the optical barrier apparatus of the present invention, the aforementioned scanning verification sections are respectively provided in each unit 10 and 20, and as shown in FIG. 22, outputs H1 and H2 from each scanning verification section, and the signals Z1 and Z2 indicating object presence/absence of each unit 10 and 20 are respectively subjected to logical product computation by logical product computation circuits 111 and 112, and each output for the computation results is subjected to logical product computation by logical product computation circuit 113, and made the final output from the optical barrier apparatus. At this time, if the construction is such that the scanning verification light receiving elements 101 and 102 are respectively attached to opposite end portions of the reflector arrays 13 and 23 of the units 10 and 20, this has the advantage that it is possible to verify that the optical beams are being normally scanned at the positions of the reflector arrays 13 and 23.

For the scan mirrors used in the abovementioned respective embodiments, for example commercial galvano-mirrors may be used. Furthermore, if semiconductor galvano-mirrors are used, the scan mirror can be made small, and consequently miniaturization of the optical barrier apparatus can be achieved.

As a semiconductor galvano-mirror, there is, in addition to a later mentioned electromagnetic type galvano-mirror, an electrostatic galvano-mirror or a piezoelectric type galvano-mirror.

The electrostatic galvano-mirror is an element manufactured by a semiconductor element manufacturing process for moving a movable plate formed with a mirror by electrostatic force. This is disclosed for example in Japanese Unexamined Patent Publication No. 5-60993. Furthermore, the piezoelectric type galvano-mirror is for moving a movable plate formed with a mirror by piezoelectric resonance, and is disclosed for example in "Reprinted from Miniature and Micro-Optics; Fabrication and System Applications Volume 1554" of the SPIE-The International Society for Optical Engineering, published July 1991.

Here is a detailed description of a suitable electromagnetic type galvano-mirror serving as a scan mirror. The electromagnetic type galvano-mirror to be described here is known for example from Japanese Unexamined Patent Publication No. 8-220453 by the present applicant.

Figure 23:
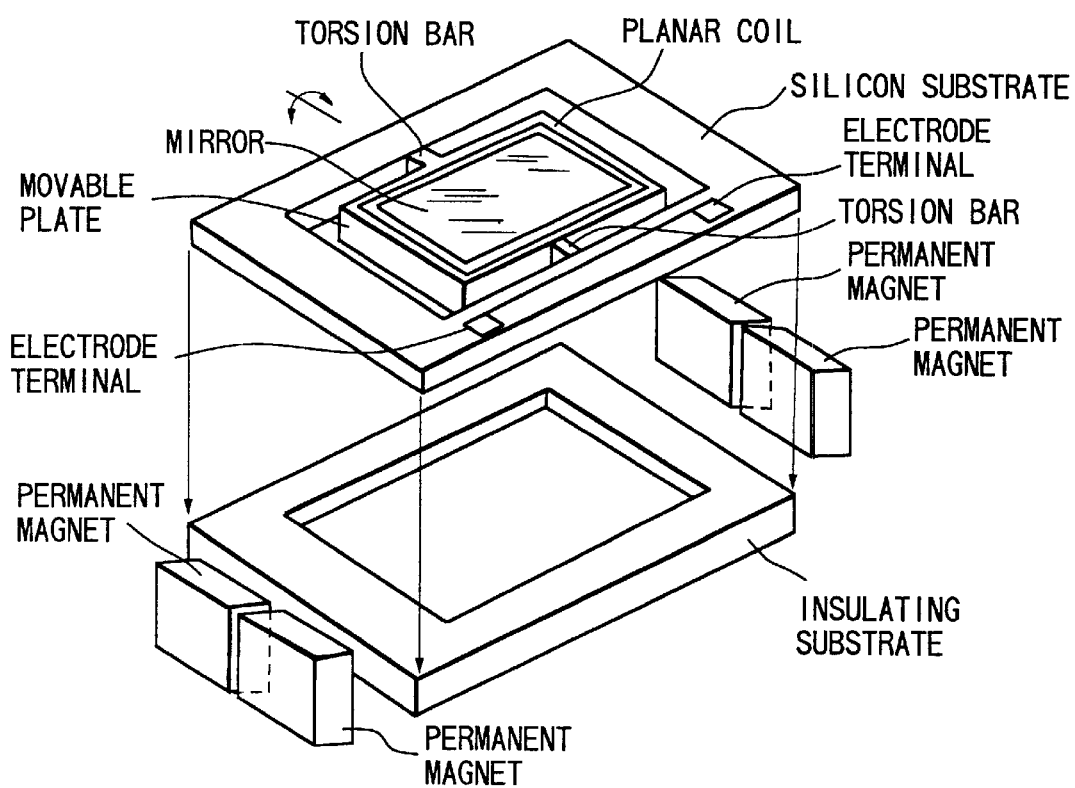
FIG. 23 is a perspective view of a semiconductor galvanomirror.

FIG. 23 is an exploded perspective view of an electromagnetic type semiconductor galvano-mirror. In order to facilitate understanding, this is shown in enlarged size.

In FIG. 23, on the inside of a silicon substrate mounted on an insulating substrate, there is provided a torsion bar integrally formed with the silicon substrate and a movable plate supported by the torsion bar. A planar coil is provided on the periphery of the movable plate, and a mirror is provided at the central portion of the movable plate. Permanent magnets are arranged on opposite side faces of the silicon substrate. The polarity of the permanent magnets is such that on one side face of the silicon substrate, the top is N and the bottom is S, while on the other side face, the bottom is N and the top is S.

Regarding the operation, when a current flows in the planar coil from electrode terminals, the current flows so as to cross the static magnetic field of the permanent magnets, so that a force acts on the opposite ends of the movable plate according to Fleming's left-hand rule, and the movable plates is rotated. When an AC current flows in the planar coil, the movable plate is rotated periodically, so that the optical beam incident on the mirror can be reflection scanned. The movable plate resonates at a constant frequency, indicating a peak in the amplitude. Consequently, since at the time of resonance a large displacement angle is obtained with a small input, it is desirable to use the galvano-mirror in the resonant condition.

With the respective embodiments of the optical barrier apparatus of the present invention described above, the detection area is monitored with a construction where the optical beams from the light emitting elements are reflected by the scan mirrors. However, the present invention is not limited to this, and for example the construction may be such that there is provided a scanning element of a semiconductor galvano-mirror type with a light emitting element mounted at the position of the scan mirror, and the light emitting element is rotated so that the detection area is scanned by an optical beam from the light emitting element.

In order to realize the optical barrier apparatus of the abovementioned respective embodiments with high safety, the signal deficiency detection circuit and the scanning verification section may be of a fail-safe construction. In the case where the threshold value computation circuit and the logical product computation circuit used in the respective circuits are configured so as to be fail-safe, then a fail-safe window-comparator/AND gate such as disclosed in U.S. Pat. No. 5,345,138, U.S. Pat. No. 4,661,880, and U.S. Pat. No. 5,027,114 can be used. These circuits and the operation and fail-safe characteristics have been illustrated in the article such as TRAN. IEE of Japan, Vol. 109-C, No. 9, September 1989 (A Method of Constructing an Interlock System using a Fail-Safe Logic Element having Window Characteristics, or "Application of Window Comparator to Majority Operation" Proc. of 19th International Symp. on Multiple-Valued Logic, IEEE Computer Society (May 1989). As the on-delay circuit, it is possible to use a fail-safe on-delay circuit known for example from PCT International Publication Numbers WO94/23303 and WO94/23496, Japanese Examined Patent Publication No. 1-23006 and Japanese Unexamined Patent Publication No. 9-162714. The fail-safe construction of the rectifying circuit and the amplifying circuit is known for example from PCT/JP93/00411. Furthermore, the construction of a fail-safe band pass filter where the attenuation amount does not drop at the time of a fault, is shown in the article such as Japanese Institute of Electrical Engineers Industrial Measurement Control Seminar documents, IIC-94-23, (94-7). By using these, the optical barrier apparatus may be constructed as a fail-safe safety apparatus which does not erroneously notify of the absence of object at the time of a fault.

INDUSTRIAL APPLICABILITY

The present invention enables a reduction in cost of an optical beam scanning type optical barrier apparatus for scanning a detection area with an optical beam to monitor for objects, without narrowing the detection area. Therefore industrial applicability is considerable.

What is claimed is:

1. An optical barrier apparatus comprising a first unit and a second unit facing each other with a detection area therebetween, wherein each of said first and second units comprises:
  optical beam generating means;
  optical beam scanning means for reflecting an optical beam generated by said optical beam generating means so as to scan an area containing said detection area;
  optical beam reflecting means for reflecting a scanning beam incident from said optical beam scanning means via said detection area by turning back at approximately 180 degrees;
  light receiving means arranged in the vicinity of said optical beam scanning means for receiving a reflection beam from said optical beam reflecting means; and
  signal deficiency detecting means for detecting the presence/absence of a deficiency of output signal of said light receiving means and generating a notification output for object absence at the time of no deficiency, and
wherein the optical beam scanning means and the light receiving means of said first unit and the optical beam scanning means and the light receiving means of said second unit are arranged on either side of the detection area at approximately diagonal positions.

2. An optical barrier apparatus according to claim 1, wherein there is provided synchronous drive means for synchronizing the two optical beam scanning means of said first and second units with respect to each other so that when a scanning beam direction on said first unit side is a diagonal direction, a scanning beam direction on said second unit side is also a diagonal direction.

3. An optical barrier apparatus according to claim 1, wherein there is provided selection drive means for selectively driving said first and second units so that object detection operations of said first unit and second unit are not performed at the same time.

4. An optical barrier apparatus according to claim 3, wherein there is provided signal selection means constructed for outputting a first selection signal and a second selection signal in complementary relation to each other from said selection drive means to the optical beam generating means of said first and second units to selectively drive said first and second units, for making an output from the signal deficiency detecting means of said first unit valid when the optical beam generating means of said first unit is selectively driven with said first selection signal, while making an output from the signal deficiency detecting means of said second unit valid when the optical beam generating means of said second unit is selectively driven with said second selection signal.

5. An optical barrier apparatus according to claim 1, wherein the emission wavelengths of optical beams respectively generated from the respective optical beam generating means of said first unit and second unit are made different from each other.

6. An optical barrier apparatus according to claim 1, wherein blinking frequencies of reflection beams respectively reflected from each optical beam reflecting means of said first unit and second unit are made different from each other.

7. An optical barrier apparatus according to claim 6, wherein respective optical beam reflecting means of said first and second units are made reflector arrays respectively comprising a plurality of reflectors, and a pitch between reflectors of said first unit and a pitch between reflectors of said second unit are made different from each other.

8. An optical barrier apparatus according to claim 6, wherein each optical beam reflecting means of said first and second units incorporates a plurality of reflecting portions divided by arranging a mask at spacing on one reflector, and a width of said mask of said first unit and a width of said mask of said second unit are made different from each other.

9. An optical barrier apparatus according to claim 5, wherein each signal deficiency detecting means of said first and second units incorporates signal extraction means for extracting only an optical beam signal component of its own unit from an output signal of said light receiving means.

10. An optical barrier apparatus according to claim 1, wherein each signal deficiency detecting means verifies that a light reception output from said light receiving means is one based on a reflection beam from said optical beam reflecting means, to generate a notification output for object absence.

11. An optical barrier apparatus according to claim 10, wherein said signal deficiency detecting means verifies that a reflection beam from at least one previously determined specific reflector is periodically received, to generate a notification output for object absence.

12. An optical barrier apparatus according to claim 11, wherein said specific reflector incorporates modulation means for periodically driving said reflector to a position for reflecting a scanning beam in a direction of said light receiving means, and to a position where a scanning beam is not reflected in a direction of said light receiving means, to modulate a reflection beam, and said signal deficiency detecting means verifies that an AC signal corresponding to a drive frequency of said specific reflector is being output from said light receiving means, to generate a notification output for object absence.

13. An optical barrier apparatus according to claim 10, wherein when said optical beam reflecting means is constructed to be divided into a plurality of reflecting portions, said signal deficiency detecting means counts the pulse number of light reception outputs of said light receiving means per one scanning period, to generate a notification output for object absence when a counted value coincides with the number of reflecting portions of said optical beam reflecting means.

14. An optical barrier apparatus according to claim 1, wherein said signal deficiency detecting means verifies that an optical beam other than a scanning beam from its own unit is periodically received via said detection region, to generate a notification output for object absence.

15. An optical barrier apparatus according to claim 14, wherein a reflector for reflecting a scanning beam from another unit so as to be received by the light receiving means via said detection area is separately provided, and said signal deficiency detecting means verifies that there is a light reception output based on the scanning beam from said other unit at a scanning timing in which the scanning beam from said other unit is incident onto said reflector, to generate a notification output for object absence.

16. An optical barrier apparatus according to claim 1, wherein scanning verification means for verifying that the scanning beam is scanned within a range of area including the detection area is provided in each unit.

17. An optical barrier apparatus according to claim 16, wherein said scanning verification means comprises a pair of scanning verification light receiving elements arranged outside said detection area, and scanning verification signal deficiency detecting means for detecting the presence/absence of a deficiency of output signal of said pair of scanning verification light receiving elements, to generate an output indicating scanning normalcy when there is no deficiency.

18. An optical barrier apparatus according to claim 1, wherein a retroreflector is used in said optical beam reflecting means.

* * * * *